(12) United States Patent
Tajima

(10) Patent No.: US 7,613,391 B2
(45) Date of Patent: Nov. 3, 2009

(54) OPTICAL SIGNAL SWITCHING DEVICE FOR USE IN AN OPTICAL PROTECTION NETWORK

(75) Inventor: Akio Tajima, Tokyo (JP)

(73) Assignee: NEC Corporation, Tokyo (JP)

( * ) Notice: Subject to any disclaimer, the term of this patent is extended or adjusted under 35 U.S.C. 154(b) by 697 days.

(21) Appl. No.: 10/620,685

(22) Filed: Jul. 17, 2003

(65) Prior Publication Data
US 2004/0017967 A1 Jan. 29, 2004

(30) Foreign Application Priority Data
Jul. 18, 2002 (JP) ............................. 2002-209776

(51) Int. Cl.
*H04B 10/00* (2006.01)
(52) U.S. Cl. .............................. 398/5; 398/42; 398/145
(58) Field of Classification Search ...................... 398/3, 398/4, 5, 41, 42, 145
See application file for complete search history.

(56) References Cited

U.S. PATENT DOCUMENTS

| 5,194,977 | A | * | 3/1993 | Nishio | 398/48 |
| 5,327,275 | A | * | 7/1994 | Yamane et al. | 398/2 |
| 5,515,194 | A | * | 5/1996 | Kanterakis et al. | 398/48 |
| 5,675,676 | A | * | 10/1997 | Yamashita et al. | 385/24 |
| 5,777,761 | A | * | 7/1998 | Fee | 398/7 |
| 5,973,809 | A | * | 10/1999 | Okayama | 398/48 |
| 6,771,852 | B2 | * | 8/2004 | Hemenway et al. | 385/24 |
| 6,771,905 | B1 | * | 8/2004 | Bortz | 398/45 |
| 6,813,408 | B2 | * | 11/2004 | Bortolini | 385/17 |
| 6,868,234 | B1 | * | 3/2005 | Tammela et al. | 398/59 |
| 7,209,659 | B2 | * | 4/2007 | Munter | 398/49 |
| 2001/0038478 | A1 | * | 11/2001 | Hwang | 359/124 |
| 2002/0044315 | A1 | * | 4/2002 | Sugawara et al. | 359/110 |

(Continued)

FOREIGN PATENT DOCUMENTS

JP 2-244919 9/1990

(Continued)

OTHER PUBLICATIONS

Chinese Office Action dated Jan. 27, 2006, with English-Language Translation.

(Continued)

*Primary Examiner*—Christina Y Leung
(74) *Attorney, Agent, or Firm*—McGinn IP Law Group, PLLC

(57) ABSTRACT

An optical network system is provided which has a signal protection function and is able to be constructed of communication nodes manufactured at low costs. An optical signal transceiver has at least one optical signal transmitting device and at least one optical signal receiving device to transmit and receive an optical signal between nodes facing each other. A switching device, when no failure has occurred in the optical signal transmitting communication line and optical signal receiving communication line, transmits an optical signal from the optical signal transmitting device to an optical signal transmitting communication line and an optical signal having been received from the optical signal receiving communication line to an optical signal receiving device. The switching device, when a failure has occurred in the optical signal receiving communication line, does switching so as to be able to receive the optical signal, to be transmitted to the optical signal receiving device, from the optical signal transmitting communication line.

10 Claims, 15 Drawing Sheets

U.S. PATENT DOCUMENTS

2003/0170020 A1* 9/2003 Chaudhuri et al. ............ 398/5
2005/0025481 A1* 2/2005 Fukashiro et al. ............ 398/45
2005/0084262 A1* 4/2005 Oberg et al. ................ 398/19

FOREIGN PATENT DOCUMENTS

| JP | 4-334135 | 11/1992 |
|---|---|---|
| JP | 10-336120 | 12/1998 |
| JP | 10336120 | * 12/1998 |
| JP | 11-225118 | 8/1999 |
| JP | 2000-324055 | 11/2000 |
| JP | 2000-332805 | 11/2000 |
| JP | 2001-274751 | 10/2001 |

OTHER PUBLICATIONS

Gu, et al., "All Optical Telecommunications Network (Revised Edition)" Nov. 1999, pp. 1-17.

Japanese Office Action dated Jul. 11, 2007, with partial English-language translation.

* cited by examiner

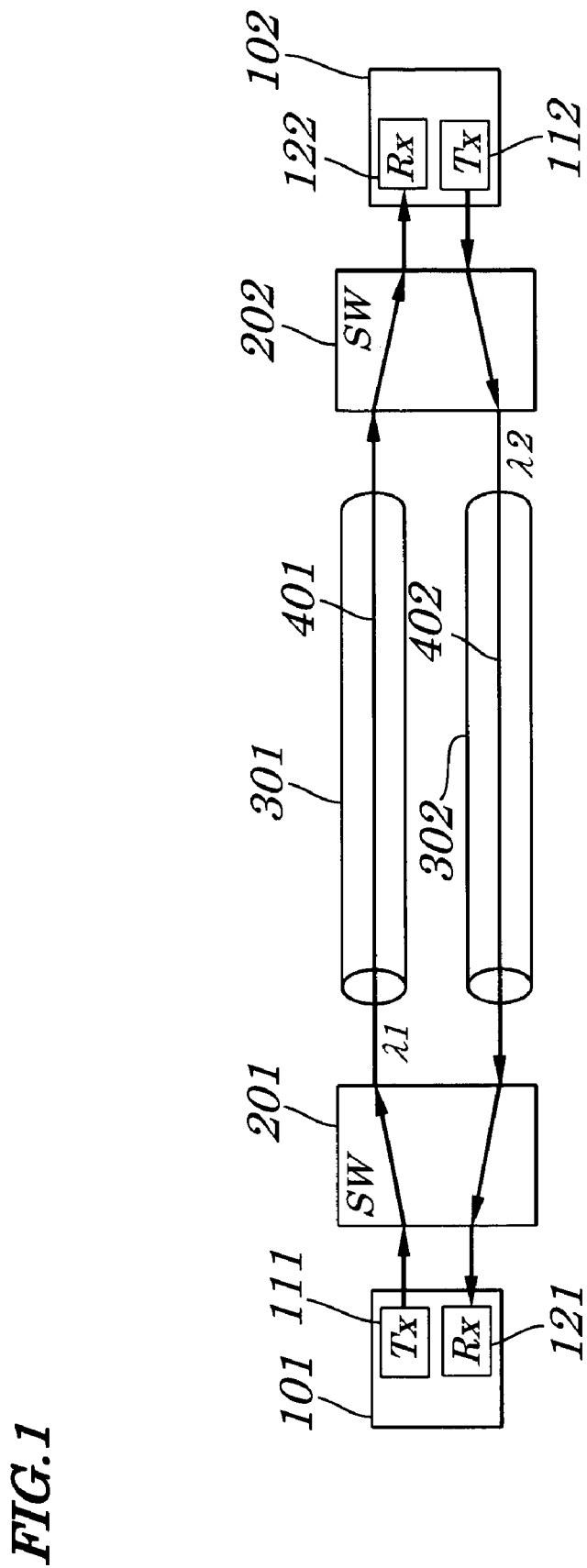

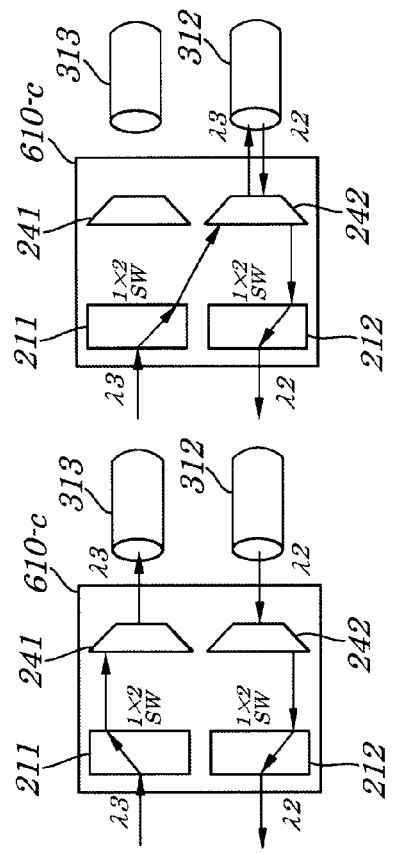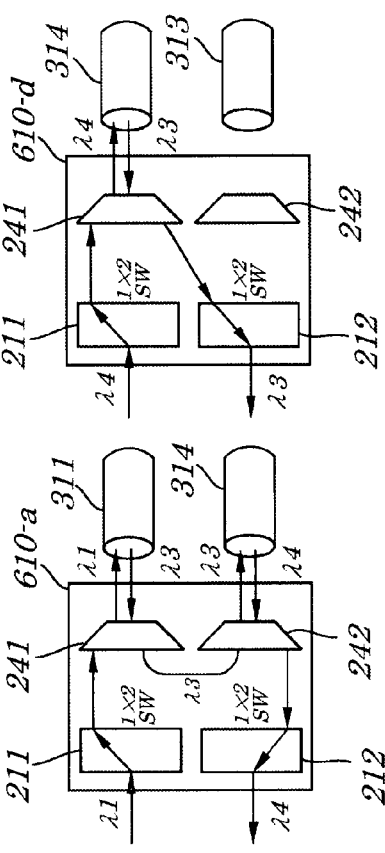

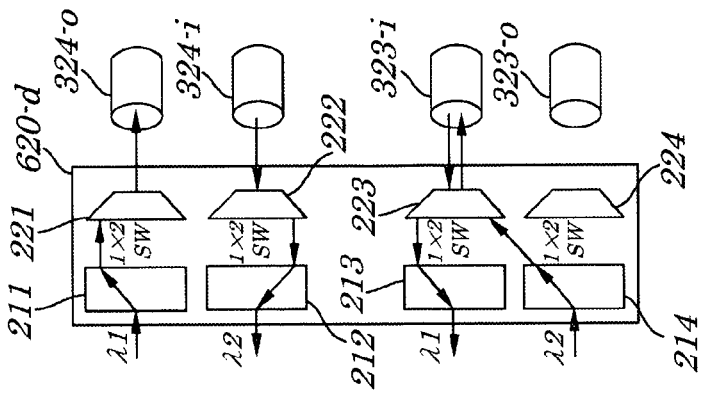
FIG.15D
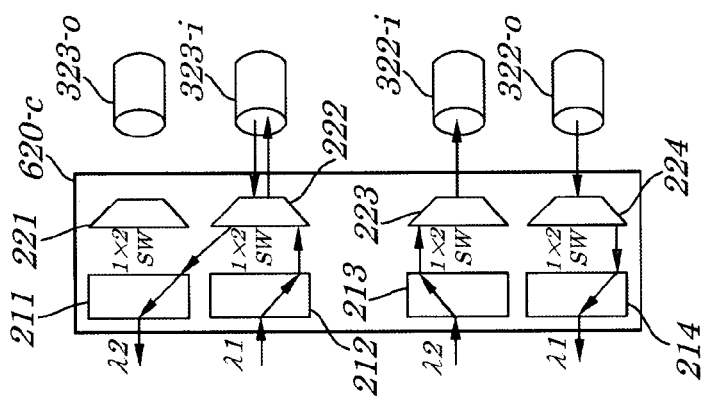
FIG.15C
FIG.15B
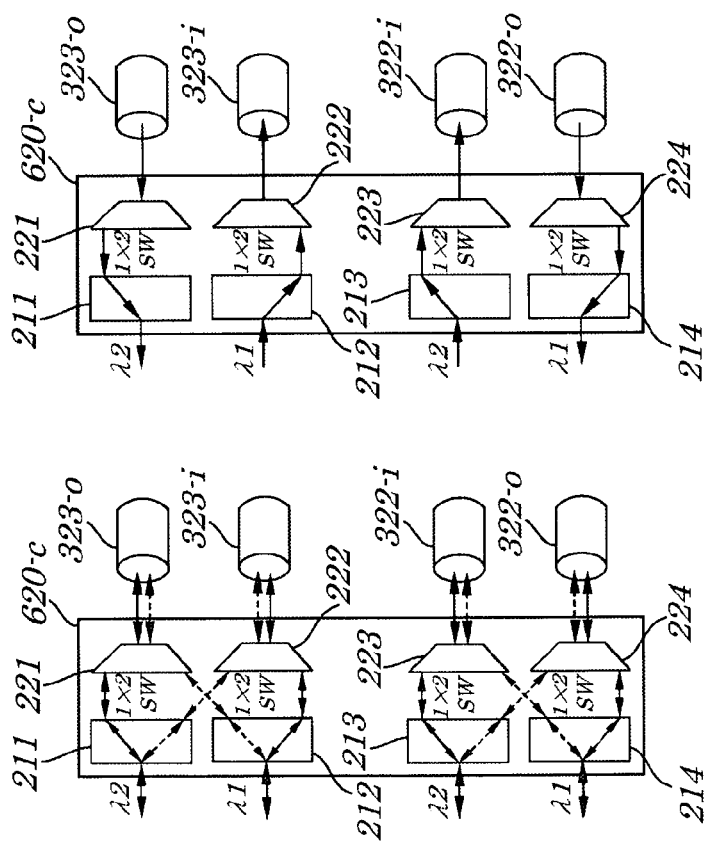
FIG.15A

OPTICAL SIGNAL SWITCHING DEVICE FOR USE IN AN OPTICAL PROTECTION NETWORK

BACKGROUND OF THE INVENTION

1. Field of the Invention

The present invention relates to a communication node and a switching device used in the communication node, and more particularly to the communication node making up a large-capacity and high-speed optical network and having a signal protection function for an optical signal communication line in the high-speed optical network, and the switching device used in the communication node.

The present application claims priority of Japanese Patent Application No. 2002-209776 filed on Jul. 18, 2002, which is hereby incorporated by reference.

2. Description of the Related Art

Conventionally, in a large-capacity and high-speed optical network, a direction of a signal that can be transmitted by one piece of an optical fiber transmission line is only one direction.

When bidirectional signals of an upward signal and a downward signal are to be transmitted between communication devices facing each other, two pieces of optical fiber communication lines are required.

Moreover, in order to provide signal protection against a failure in an optical fiber communication line, two pieces of optical fiber communication lines, one serving as an optical fiber transmission line being presently activated and another serving as an optical fiber transmission line being prepared for standby use for each of the upward and downward signals. Therefore, in this case, four pieces of optical fiber transmission lines are required.

An example of a conventional optical network having a function of signal protection is disclosed in Japanese Patent Application Laid-open No. Hei 4-334135. In the disclosed conventional optical network, an optical signal transmitted from the optical signal transmitting device is branched by an optical directional coupler into two signals, one flowing through an optical fiber transmission line being presently activated and another flowing through an optical fiber transmission line being prepared for standby use. Each of optical signals transmitted through the two optical fiber transmission lines is received separately by one of two optical signal receiving devices. Then, a signal switching switch selects either of the signals received by the two optical signal receiving devices.

Bidirectional optical transmission including upward and downward transmission can be achieved by combining two configurations disclosed in the above Japanese Patent Application Laid-open No. Hei 4-334135.

Moreover, in Japanese Patent Application Laid-open No. Hei 10-336120, an example of configurations of a conventional optical network is shown in which bidirectional transmission that can provide signal protection is achieved by using two pieces of optical fiber transmission lines. In the disclosed configuration, two nodes are placed so as to face each other, which are connected by two optical fiber transmission lines (being called "bidirectional lines" in the above Patent Application). Each of the nodes has a switching unit and an optical unit. The switching unit is used to handle electrical signals which operates to switch connection of signals to do switching for signal protection. The optical unit is made up of an optical signal transmitting device and an optical signal receiving device which operate to convert an electrical signal to an optical signal and vice versa in order to transmit and receive an optical signal.

In the optical network disclosed in Japanese Patent Application Laid-open No. Hei 10-336120, an upward signal for present operations and a downward signal for standby operations are transmitted by a first optical fiber transmission line and a downward signal for present operations and an upward signal for standby operations are transmitted by a second optical fiber transmission line.

In the above example, let it be assumed, for example, that a failure occurs in the first optical fiber transmission line. Since the upward signal for present operations is being transmitted through the first optical fiber transmission line, switching is done so that the upward signal is transmitted through the second optical fiber transmission line provided for standby use. The switching for signal protection is done electrically within the switching unit.

When bidirectional optical transmission is to be achieved by combining two configurations disclosed in the above Japanese Patent Application Laid-open No. Hei 4-334135, an optical fiber transmission line being presently activated and an optical fiber to be prepared for standby use are required for each of an upward signal and downward signal. That is, four optical fiber transmission lines are required.

Therefore, in the optical network disclosed in Japanese Patent Application Laid-open No. Hei 4-334135, many optical fiber transmission lines have to be installed, thus causing increased costs for the installation of the optical network. Moreover, in the case of providing service using a dark fiber, its usage charge is costly.

Also, in the optical network disclosed in Japanese Patent Application Laid-open No. Hei 4-334135, four pieces of optical signal receiving devices are required, one for receiving an upward signal for present operations, another for receiving an downward signal for present operations, a third for receiving an upward signal for standby operations, and a fourth for receiving a downward signal for standby operations. Furthermore, when an optical signal transmitting device has to be constructed so that optical signal transmission is carried out in a duplexed manner to achieve improvement of reliability, four pieces of optical signal transmitting devices, as in the case of the optical signal receiving device, are required accordingly.

Therefore, in the conventional optical network disclosed in Japanese Patent Application Laid-open No. Hei 4-334135, increased costs for the optical transmission device are inevitable due to the many required optical components. An optical signal transmitting device and an optical signal receiving device that can provide a transmission speed exceeding 10 G bps, in particular, are very costly and large in size, which causes high costs for the optical transmission device.

Moreover, since components prepared for standby use including the optical fiber transmission line, the optical signal transmitting device, and the optical signal receiving device are not utilized in normal times, a transmission band that the network system can use is not effectively used.

Also, in the optical network disclosed in Japanese Patent Application Laid-open No. Hei 10-336120, the optical unit requires four pieces of optical signal transmitting devices including the optical signal transmitting device being presently activated to transmit the upward signal, the optical signal transmitting device being presently activated to transmit the downward signal, the optical signal transmitting devices being prepared for standby use to transmit the upward signal and the optical signal transmitting device being prepared for standby use to transmit the downward signal. Similarly, the optical unit requires four pieces of optical signal receiving devices including the optical signal receiving device being presently activated to receive the upward signal, the optical signal receiving device being presently activated to receive the downward signal, the optical signal receiving device being prepared for standby use to receive the upward signal and the optical signal receiving device being prepared for standby use to receive the downward signal.

As a result, in the optical network disclosed in Japanese Patent Application Laid-open No. Hei 10-336120, as in the case of that disclosed in Japanese Patent Application Laid-open No. Hei 4-334135, increased costs of the optical transmission device is inevitable due to the many required optical components. Also, an optical signal transmitting device and an optical signal receiving device that can provide a transmission speed exceeding 10 G bps, in particular, are very costly and large in size, which causes high costs for the optical transmission device.

SUMMARY OF THE INVENTION

In view of the above, it is an object of the present invention to provide an optical network system made up of a communication node manufactured at low costs and having a signal protection function.

According to a first aspect of the present invention, there is provided a communication node including:

an optical signal transceiver having at least one optical signal transmitting device and at least one optical signal receiving device to transmit and receive an optical signal to and from an opposite communication node;

at least one optical signal transmitting communication line to transmit an optical signal to the opposite communication node;

at least one optical signal receiving communication line to receive an optical signal from the opposite communication node; and a switching device being connected to the optical signal transmitting device and to the optical signal receiving device to transmit, when no failure has occurred in the optical signal transmitting communication line and in the optical signal receiving communication line, an optical signal fed from the optical signal transmitting device to the optical signal transmitting communication line and to transmit an optical signal fed from the optical signal receiving communication line to the optical signal receiving device, which does switching, when a failure has occurred in the optical signal transmitting communication line, so that the optical signal fed from the optical signal transmitting device is transmitted to the optical signal receiving communication line and which does switching, when a failure has occurred in the optical signal receiving communication line, so that the optical signal to be fed to the optical signal receiving device is received from the optical signal transmitting communication line.

In the foregoing first aspect, a preferable mode is one wherein wavelengths of optical signals transmitted from all the optical signal transmitting devices being placed in the optical signal transceiver are different from one another and from wavelengths of optical signals transmitted from the opposite communication node.

Also, another preferable mode is one wherein the switching device includes an optical switch that enables an optical signal to be transmitted in bidirectional directions.

According to a second aspect of the present invention, there is provided a communication node including:

a plurality of optical signal transceivers each having at least one optical signal transmitting device and at least one optical signal receiving device, which transmit and receive an optical signal to and from an opposite communication node;

a plurality of optical signal communication lines to transmit and receive an optical signal between each of the optical signal transceivers and the opposite communication node; and a switching device being connected to the optical signal transmitting device and to the optical signal receiving device, which does switching, when a failure has occurred in any of the plurality of the optical signal communication line, so that an optical signal that had been transmitted through the optical signal communication line is transmitted in a multiplexed manner through any other optical signal communication line.

In the foregoing second aspect, a preferable mode is one wherein a wavelength of an optical signal that had been transmitted through an optical signal communication line in which a failure occurred is different from a wavelength of an optical signal that is transmitted through an optical signal communication line in which the optical signal is transmitted in a multiplexed manner when a failure occurs in the optical signal communication line.

According to a third aspect of the present invention, there is provided a communication node being used in a ring-type network in which a plurality of the communication nodes is connected, including:

an optical signal transceiver having at least one optical signal transmitting device and at least one optical signal receiving device to receive an optical signal from one adjacent communication node and to transmit the optical signal to an other adjacent communication node; and a switching device being connected to one optical signal communication line connected to the one adjacent communication node, to an other optical signal communication line connected to the other adjacent communication node, to the optical signal transmitting device and to the optical signal receiving device, which receives, when no failure has occurred in the one optical signal communication line and in the other optical signal communication line, an optical signal sent from the one adjacent communication node from the one optical signal communication line and transmits it to the optical signal receiving device and transmits an optical signal to be transferred from the optical signal transmitting device to the other adjacent communication node to the other optical signal communication line and relays an optical signal, when an optical signal fed from a communication node other than the one adjacent communication node making up the ring-type network is input from the other optical signal communication line to transfer it to the one optical signal communication line and which does switching, when the failure has occurred in the one optical signal communication line, so that the optical signal fed from the one adjacent communication node is received from the other optical signal communication line and is transmitted to the optical signal receiving device and does switching, when the failure has occurred in the other optical signal communication line, so that the optical signal to be transferred from the optical signal transmitting device to the other adjacent communication node is transmitted to the one optical signal communication line.

In the foregoing third aspect, a preferable mode is one wherein wavelengths of optical signals transmitted by all communication nodes making up the ring-type network are different from one another.

According to a fourth aspect of the present invention, there is provided a communication node being used in a ring-type network in which a plurality of communication nodes is connected, including:

an optical signal transceiver having a plurality of optical signal transmitting devices to transmit an optical signal to an adjacent communication node and a plurality of optical signal receiving devices to receive an optical signal from the adjacent communication node and to transmit and receive optical signals to and from both of the adjacent communication node;

an optical signal transmitting communication line to transmit an optical signal to the adjacent communication node;

an optical signal receiving communication line to receive an optical signal from the adjacent communication node;

a switching device being connected to the optical signal transmitting device and to the optical signal receiving device, which transmits, when no failure has occurred in the optical signal transmitting communication line and in the optical signal receiving communication line, an optical signal to be transferred from the optical signal transmitting device to the adjacent communication node to the optical signal transmitting communication line and receives an optical signal sent from the adjacent communication node from the optical signal receiving communication line and transmits it to the optical signal receiving device and which does switching, when a failure has occurred in the optical signal transmitting communication line, so that an optical signal that had been transmitted from the optical signal transmitting device to the optical signal transmitting communication line is transmitted to the optical signal receiving communication line being connected similarly to the adjacent communication node to which the optical signal transmitting communication line had been connected and does switching, when a failure has occurred in the optical signal receiving communication line, so that an optical signal that had been received from the optical signal receiving communication line and had been transmitted to the optical signal receiving device is received from an optical signal transmitting communication line being connected similarly to the adjacent communication node to which the optical signal receiving communication line had been connected.

In the foregoing fourth aspect, a preferable mode is one wherein wavelengths of optical signals to be transmitted from the optical signal transmitting device to the adjacent communication node are different from those of optical signals fed from the adjacent communication node.

According to a fifth aspect of the present invention, there is provided a switching device being connected to an optical signal transceiver including at least one optical signal transmitting device and at least one optical signal receiving device to transmit and receive an optical signal to and from an opposite communication node and making up a communication node with the optical signal transceiver, the switching device configured to be connected to at least one piece of an optical signal transmitting communication line to transmit an optical signal to the opposite communication node, at least one piece of an optical signal receiving communication line to receive an optical signal from the opposite communication node, the optical signal transmitting device and the optical signal receiving device; and wherein, when no failure has occurred in the optical signal transmitting communication line and in the optical signal receiving communication line, an optical signal fed from the optical signal transmitting device is transmitted to the optical signal transmitting communication line and an optical signal fed from the optical signal receiving communication line is transmitted to the optical signal receiving device and wherein, when a failure has occurred in the optical signal transmitting communication line, switching is done so that the optical signal fed from the optical signal transmitting device is transmitted to the optical signal receiving communication line and, when a failure has occurred in the optical signal receiving communication line, switching is done so that the optical signal to be fed to the optical signal receiving device is received from the optical signal transmitting communication line In the foregoing fifth aspect, a preferable mode is one wherein wavelengths of optical signals fed from all of the optical signal transmitting devices being placed in the optical signal transceiver are different from one another and from those of optical signals transmitted from the opposite communication node.

Also, another preferable mode is one that wherein further includes an optical switch that enables an optical signal to be transmitted in bidirectional directions.

According to a sixth aspect of the present invention, there is provided a switching device being connected to a plurality of optical signal transceivers each having at least one optical signal transmitting device and at least one optical signal receiving device to transmit and receive an optical signal to and from an opposite communication node and making up a communication node with the plurality of optical signal transceivers, the switching device configured to be connected to a plurality of optical signal communication lines to transmit and receive an optical signal between the optical signal transmitting device and the opposite communication node, each the optical signal transmitting device, and each the optical signal receiving device, wherein switching is done, when a failure occurs in any of the optical signal communication lines, so that an optical signal that had been transmitted through the optical signal communication line in which the failure has occurred is transmitted in a multiplexed manner through any other optical signal communication lines.

In the foregoing sixth aspect, a preferable mode is one wherein wavelengths of optical signals that had been transmitted through an optical signal communication line in which a failure has occurred are different from those of optical signals that are transmitted through an optical signal communication line in which the optical signals are transmitted in a multiplexing manner when the failure has occurred in the optical signal communication line.

According to a seventh aspect of the present invention, there is provided a switching device being connected to an optical signal transceiver having at least one optical signal transmitting device and at least one optical signal receiving device and receiving an optical signal from one adjacent communication node and transmitting an optical signal to an other adjacent communication node and making up a communication node of a ring-type network, the switching device configured to be connected one optical signal communication line connected to the one adjacent communication node, to an other optical signal communication line connected to the other adjacent communication node, to the optical signal transmitting device and to the optical signal receiving device, wherein, when no failure has occurred in the one optical signal communication line and in the other optical signal communication line, an optical signal fed from the one adjacent communication node is received from the one optical signal communication line and is transmitted to the optical signal receiving device and an optical signal to be transferred from the optical signal transmitting device to the other adjacent communication node is transmitted to the other optical signal communication line and, when an optical signal fed from a communication node other than the one adjacent communication node making up the ring-type network is input from the adjacent optical signal communication line, the optical signal is relayed to transfer it to the one optical signal communication line and switching is done, when a failure occurs in the one optical signal communication line, so that the optical signal fed from the one adjacent communication node is received through the other optical signal communication line and is transmitted to the optical signal receiving device and, when a failure has occurred in the other optical signal communication line, an optical signal to be transferred from the optical signal transmitting device to the other adjacent communication node is transmitted to the one optical signal communication line.

In the foregoing seventh aspect, a preferable mode is one wherein wavelengths of optical signals to be transmitted by all communication nodes making up the ring-type network are different from one another.

According to an eighth aspect of the present invention, there is provided a switching device being connected to an optical signal transceiver having a plurality of optical signal transmitting devices to transmit an optical signal to adjacent communication nodes and a plurality of optical signal receiving devices to receive an optical signal from the adjacent communication nodes and to transmit and receive an optical signal to and from both of the adjacent communication nodes and making up a communication node of a ring-type network, the switching device configured to be connected to an optical signal transmitting communication line to transmit an optical signal to the adjacent communication node, an optical signal receiving communication line to receive an optical signal from the adjacent communication node, the plurality of the optical signal transmitting devices and the plurality of the optical signal receiving devices, wherein no failure has occurred in the optical signal transmitting communication line and in the optical signal receiving communication line, an optical signal to be transferred from the optical signal transmitting device to the adjacent communication node is transmitted to the optical signal transmitting communication line and an optical signal fed from the adjacent communication node is received from the optical signal receiving communication line and is transmitted to the optical signal receiving device and, when a failure has occurred in the optical signal transmitting communication line, switching is done so that an optical signal that had been transmitted from the optical signal transmitting device to the optical signal transmitting communication line is transmitted to an optical signal receiving communication line being connected similarly to the adjacent communication node to which the optical signal transmitting communication line had been connected and when a failure has occurred in the optical signal receiving communication line, switching is done so that an optical signal that had been received from the optical signal receiving communication line and transmitted to the optical signal receiving device is received from an optical signal transmitting communication line being connected similarly to the adjacent communication node to which the optical signal receiving communication line had been connected.

In the foregoing eighth aspect, a preferable mode is one wherein wavelengths of optical signals to be transmitted from the optical signal transmitting device to the adjacent communication node are different from those of optical signals fed from the adjacent communication node.

According to a ninth aspect of the present invention, there is provided a switching device for transmitting a plurality of external optical signals through a plurality of optical signal communication lines, including:

a plurality of optical multiplexing and demultiplexing devices each being placed so as to correspond to the optical signal communication line and having a plurality of first input and output ports and one second input and output ports, which allows optical signals being different from one another to be transmitted between each of the first input and output ports and the second input and output ports and has the second input and output ports be connected to an optical signal communication line being corresponded to the optical multiplexing and demultiplexing device; and a plurality of optical switches being placed so as to correspond to the external optical signal, which allows an external optical signal being corresponding to each of the optical switches to be input to the first input and output port of the optical multiplexing and demultiplexing device when no failure has occurred in an optical signal communication line corresponding to a specified optical multiplexing and demultiplexing device and which does switching, when a failure has occurred in the optical signal communication line, so that the external optical signal is input to a first input and output port of an other multiplexing and demultiplexing device.

In the foregoing ninth aspect, a preferable mode is one wherein a plurality of the first input and output ports of the plurality of the optical multiplexing and demultiplexing devices allow optical signal having wavelengths being different from one another to be transmitted.

According to a tenth aspect of the present invention, there is provided a switching device for transmitting a plurality of external optical signals through a plurality of optical signal communication lines including:

a plurality of first optical multiplexing and demultiplexing devices each being placed so as to correspond to the optical signal communication line and having a plurality of first input and output ports and one second input and output ports, which allows optical signals being different from one another to be transmitted between each of the first input and output ports and the second input and output ports and has each of the second input and output ports be connected to an optical signal communication line being corresponded to each of the optical multiplexing and demultiplexing devices;

a plurality of second optical multiplexing and demultiplexing devices each having a plurality of third input and output ports and one fourth input and output port, which allows optical signals being different from one another to be transmitted between each of the third input and output ports and the fourth input and output ports, each of the third input and output ports being connected to each of a plurality of external optical signals input and output ports being different from one another; and an optical switch being placed so as to correspond to each of the second optical multiplexing and demultiplexing devices, which has a fourth input and output port of a second optical multiplexing and demultiplexing device being corresponded to the optical switch be connected to a first input and output port of the first optical multiplexing and demultiplexing device when no failure has occurred in an optical signal communication line corresponding to a specified first optical multiplexing and demultiplexing device and does switching so that a fourth input and output port of the second optical multiplexing and demultiplexing device is connected to a first input and output port of other first optical multiplexing and demultiplexing device when a failure has occurred in the optical signal communication line.

In the foregoing tenth aspect, a preferable mode is one wherein the plurality of the first input and output ports of the first optical multiplexing and demultiplexing device allows optical signals having wavelengths being different from one another to be transmitted and a plurality of the third input and output ports of the second optical multiplexing and demultiplexing device allows optical signals having wavelengths being different from one another to be transmitted.

According to an eleventh aspect of the present invention, there is provided a switching device being connected between two optical signal communication lines making up a ring-type network for transmitting an external optical signal through the ring-type network, including:

two optical multiplexing and demultiplexing devices each being placed so as to correspond to each of the optical signal communication lines and having a plurality of first input and output ports and one second input and output port, which allows optical signals being different from one another to be transmitted between each of the first input and output port and the second input and output port and has an optical signal communication line corresponding to each of the optical multiplexing and demultiplexing devices be connected to the second input and output port and has part of the first input and output ports be connected to one another; and a plurality of optical switches each being placed so as to correspond to the external optical signal, which has, when no failure has occurred in an optical signal communication line being connected to an optical multiplexing and demultiplexing device corresponding to a specified optical signal communication line, an external optical signal being corresponded to each of the optical switches be input to a first input and output port of each of the optical multiplexing and demultiplexing devices and does switching, when a failure has occurred in the optical signal communication line, so that the external optical signal is input to a first input and output port of each of the optical multiplexing and demultiplexing devices corresponding to an other one optical signal communication line.

In the foregoing eleventh aspect, a preferable mode is one wherein a plurality of the first input and output ports of the plurality of the optical multiplexing and demultiplexing devices allow optical signal having wavelengths being different from one another to be transmitted.

According to a twelfth aspect of the present invention, there is provided a switching device for transmitting an external optical signal through a ring-type network in which a plurality of optical signal communication lines are connected between adjacent communication nodes, including:

a plurality of optical multiplexing and demultiplexing devices each being placed so as to correspond to each of the optical signal communication lines and having a plurality of first input and output ports and one second input and output ports, which allows optical signals being different from one another to be transmitted between each of the first input and output ports and the second input and output ports and has an optical signal communication line corresponding to each of the optical multiplexing and demultiplexing devices be connected to the second input and output port; and a plurality of optical switches each being placed so as to correspond to the external optical signal, which has, when no failure has occurred in an optical signal communication line corresponding to a specified optical multiplexing and demultiplexing device, an external optical signal corresponding to each of the optical switches be connected to a first input and output port of each of the optical multiplexing and demultiplexing devices and does switching, when a failure has occurred in the optical signal communication line, so that the external optical signal be input to a first input and output port of other optical multiplexing and demultiplexing devices.

In the foregoing twelfth aspect, a preferable mode is one wherein a plurality of the first input and output ports of the plurality of the optical multiplexing and demultiplexing devices allow optical signal having wavelengths being different from one another to be transmitted.

With the above configurations, if the failure occurs in any of optical fiber transmission lines, the switching device does switching so that the optical signal begins to be transmitted through another optical fiber transmission in which no failure has occurred and, therefore, installation of a communication line for standby use and of an optical signal transceiver and optical signal receiver to be used to transmit an optical signal through the communication line for standby use is not required. This can achieve a satisfactory signal protection function that leads to high reliability in the optical network system. This also enables the dual-ring-type optical network system to be constructed at low costs.

BRIEF DESCRIPTION OF THE DRAWINGS

The above and other objects,. advantages, and features of the present invention will be more apparent from the following description taken in conjunction with the accompanying drawings in which:

FIG. 1 is a block diagram showing configurations of an optical network system according to a first embodiment of the present invention;

FIGS. 10A, 10B, 10C, 10D, 10E, and 10F are diagrams explaining configurations and operations of a signal protection switch of the third embodiment of the present invention;

FIGS. 15A, 15B, 15C, and 15D are diagrams explaining configurations and operations of a signal protection switch of the fourth embodiment of the present invention.

DETAILED DESCRIPTION OF THE PREFERRED EMBODIMENTS

Figure 2A:
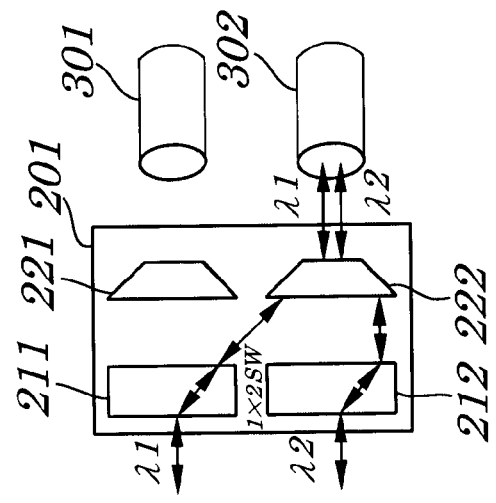
FIGS. 2A, 2B, and 2C are diagrams illustrating configurations and operations of a signal protection switch of the first embodiment of the present invention.

Best modes of carrying out the present invention will be described in further detail using various embodiments with reference to the accompanying drawings.

First Embodiment

FIG. 1 is a block diagram showing configurations of an optical network system according to a first embodiment of the present invention. As shown in FIG. 1, the optical network system of the first embodiment is made up of optical signal transceivers 101 and 102, signal protection switches 201 and 202, and optical fiber transmission lines 301 and 302.

Each of the optical fiber transmission lines 301 and 302 is installed separately in a different path from each other. Therefore, there is almost no case where transmission failures of optical signals 401 and 402 occur in both of the optical fiber transmission lines 301 and 302 at a same time.

Each of the optical signal transceivers 101 and 102 has a same configuration and transmits and receives optical signals 401 and 402 in a direction opposite to each other. The optical signal transceiver 101 is made up of an optical signal transmitting section 111 and an optical signal receiving section 121. The optical signal transceiver 102 is made up of an optical signal transmitting section 112 and an optical signal receiving section 122. Each of the optical signal transmitting sections 111 and 112 transmits a high-speed optical signal 401 or 402 reaching a transmission speed of, for example, 10 G bps. Each of the optical signal receiving sections 121 and 122 can receive the high-speed optical signal 402 or 401 reaching a transmission speed of, for example, 10 G bps.

In the example employed in the first embodiment, a wavelength "$\lambda 1$" of light as a carrier wave of the optical signal 401 transmitted by the optical signal transmitting section 111 is 1536.61 nm. A wavelength "$\lambda 2$" of light as a carrier wave of the optical signal 402 transmitted by the optical signal transmitting section 112 is 1555.75 nm. Accordingly, the wavelength "$\lambda 1$" of carrier light of the optical signal 401 transmitted by the optical signal transceiver 101 (that is, light to be received by the optical signal transceiver 102) is different from the wavelength "$\lambda 2$" of carrier light of the optical signal 402 transmitted by the optical signal transceiver 102 (that is, light to be received by the optical signal transceiver 101).

The signal protection switches 201 and 202 have a same configuration and face each other with the optical fiber transmission lines 301 and 302 being interposed between the signal protection switches 201 and 202.

The signal protection switch 201 sends out an optical signal 401 transmitted from the optical signal transceiver 101 to the optical fiber transmission line 301 or 302. Moreover, the signal protection switch 201 sends out an optical signal 402 received from the optical fiber transmission line 301 or 302 to the optical signal transceiver 101.

Likewise, the signal protection switch 202 sends out an optical signal 402 transmitted from the optical signal transceiver 102 to the optical fiber transmission line 301 or 302. Moreover, the signal protection switch 202 sends out an optical signal 401 received from the optical signal communication line 301 or 302 to the optical signal transceiver 102.

Figure 2B:
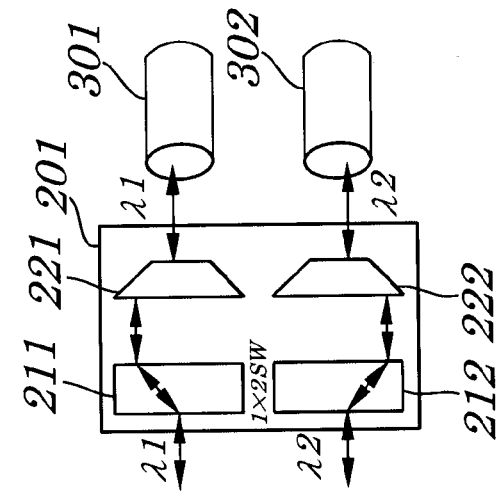
Figure 2C:
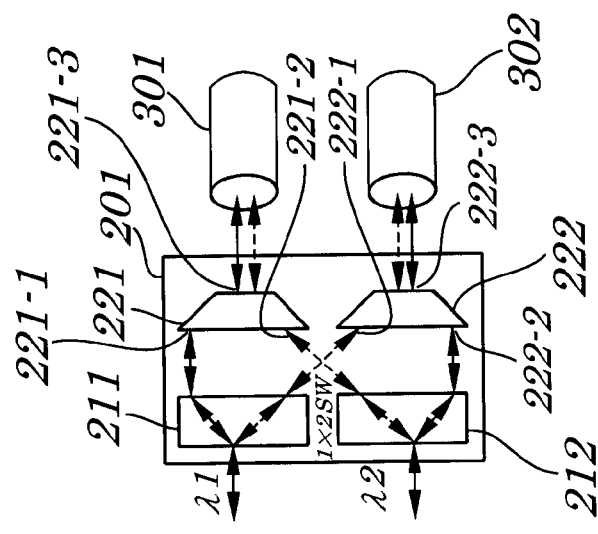

FIGS. 2A, 2B, and 2C are diagrams for illustrating configurations and operations of the signal protection switches 201 and 202 according to the first embodiment of the present invention. In FIGS. 2A, 2B, and 2C, the signal protection switch 201 is shown as an example, however, the signal protection switch 202 has same configurations and operations as the signal protection switch 201 and is therefore not shown. FIG. 2A is a block diagram showing configurations of the signal protection switch 201 of the first embodiment.

As shown in FIG. 2A, the signal protection switch 201 has optical switches 211 and 212 and optical multiplexing and demultiplexing devices 221 and 222.

The optical switch 211 selects either of the optical multiplexing and demultiplexing device 221 or 222 to allow either of them to be connected to the optical signal transmitting section 111 (FIG. 1) of the optical signal transceiver 101 (FIG. 1). The optical switch 212 selects either of the optical multiplexing and demultiplexing device 221 or 222 to allow either of them to be connected to the optical signal receiving section 121 (FIG. 1) of the optical signal transceiver 101.

The solid-line arrows shown in FIG. 2A illustrate a route which is selected in an ordinary state to transmit the optical signal. The dashed-line arrows shown in FIG. 2A illustrate a route which is selected when a failure occurs in an optical fiber transmission line (either of 301 or 302) and through which the optical signal can be also transmitted.

FIG. 2B is a diagram for illustrating a state of selection of the optical switch 211 or 212 in an ordinary operation state. In the example shown in FIG. 2B, the optical switch 211 selects the optical multiplexing and demultiplexing device 221 and the optical switch 212 selects the optical multiplexing and demultiplexing device 222.

FIG. 2C is a diagram for illustrating selection of the optical switches 211 and 212 in a state in which a failure has occurred in the optical fiber transmission line 301. In the example, shown in FIG. 2C, the optical switches 211 and 212 select the optical multiplexing and demultiplexing device 222. On the other hand, in a state in which a failure has occurred in the optical fiber transmission line 302, as not shown in FIG. 2C, the optical switches 211 and 212 select the optical multiplexing and demultiplexing device 221.

The optical multiplexing and demultiplexing devices 221 and 222 are broadband-type optical multiplexing and demultiplexing devices.

The optical multiplexing and demultiplexing device 221 has input and output ports 221-1, 221-2, and 221-3. As shown in FIG. 2A, the input and output port 221-1 is connected to the optical switch 211. The input and output port 221-2 is connected to the optical switch 212. The input and output port 221-3 is connected to the optical fiber transmission line 301.

Likewise, as shown in FIG. 2A, the optical multiplexing and demultiplexing device 222 has input and output ports 222-1, 222-2, and 222-3. The input and output port 222-1 is connected to the optical switch 211. The input and output port 222-2 is connected to the optical switch 212. The input and output port 222-3 is connected to the optical fiber transmission line 302.

Each of the optical multiplexing and demultiplexing devices 221 and 222 allows light with a wavelength of "$\lambda 1$" to be transmitted between each of the input and output ports 221-1 and 222-1 and each of the input and output ports 221-3 and 222-3. Moreover, each of the optical multiplexing and demultiplexing devices 221 and 222 allows light with a wavelength of "$\lambda 2$" to be transmitted between each of the input and output ports 221-2 and 222-2 and each of the input and output ports 221-3 and 222-3.

Figure 3:
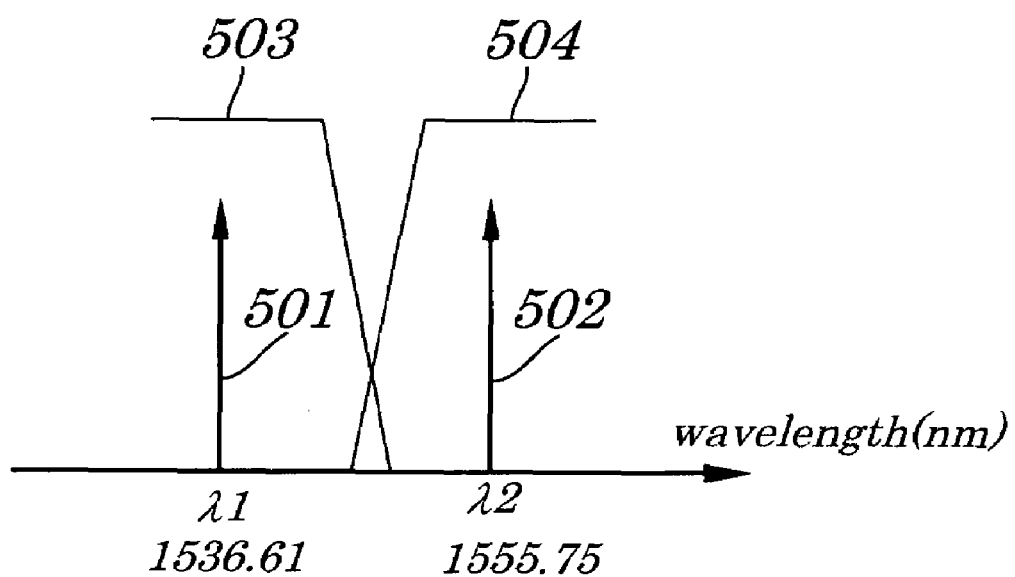
FIG. 3 is a diagram showing an optical transmission characteristic of an optical multiplexing and demultiplexing device of the first embodiment of the present invention.

FIG. 3 is a diagram showing an optical transmission characteristic of the optical multiplexing and demultiplexing devices 221 and 222 of the first embodiment. In FIG. 3, the optical transmission characteristic between each of the input and output ports 221-1 and 222-1 and each of the input and output ports 221-3 and 222-3 is illustrated as a transmission characteristic 503. Also, the optical transmission characteristic between each of the input and output ports 221-2 and 222-2 and each of the input and output ports 221-3 and 222-3 is illustrated as a transmission characteristic 504.

Isolation between the input and output port 221-1 or 222-1 allowing an optical signal 501 with a wavelength "λ1" to be transmitted and the input and output port 221-2 or 222-2 allowing an optical signal 502 with a wavelength "λ2" to be transmitted is 35 dB or more. Also, directivity between them is 50 dB or more.

Next, flows of operations in the optical network system of the first embodiment are described.

In a state where no failure has occurred through the optical fiber transmission line 301 and the optical fiber transmission line 302, as shown in FIG. 1, an optical signal 401 sent out from the optical signal transceiver 101 is transmitted through the optical fiber transmission line 301 and is received by the optical signal transceiver 102. Also, an optical signal 402 sent out from the optical signal transceiver 102 is transmitted through the optical fiber transmission line 302 and is received by the optical signal transceiver 101.

Figure 4:
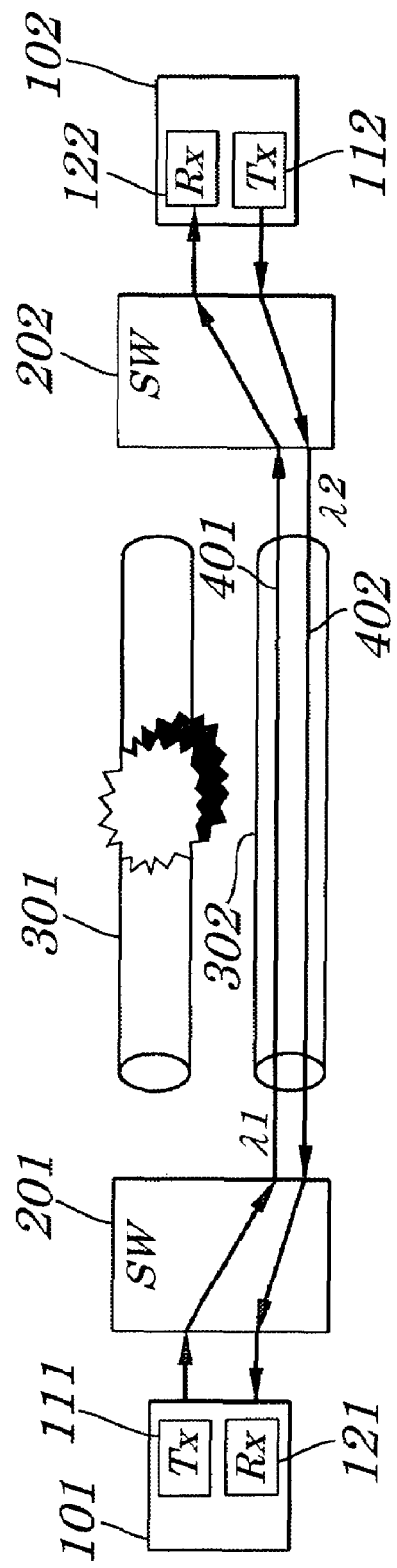
FIG. 4 is a diagram explaining operations of the optical network system of the first embodiment of the present invention.

FIG. 4 is a diagram explaining operations of the optical network system of the first embodiment of the present invention. As shown in FIG. 4, let it be assumed that a failure caused by breakage of an optical fiber, degradation in characteristics or a like has occurred in the optical fiber transmission line 301.

If the failure has occurred in the optical fiber transmission line 301, as shown in FIG. 4, in a normal state, switching is done so that the optical signal 401 which had been transmitted through the optical fiber transmission line 301 begins to be transmitted through the optical fiber transmission line 302. That is, both the optical signals 401 and 402 begin to be transmitted through same one piece of the optical fiber transmission line 302. Since each of the optical signals 401 and 402 has a different wavelength, the two optical signals can be completely isolated by the optical multiplexing and demultiplexing device 222 and, therefore, both the optical signals 401 and 402 can be normally transmitted between the optical signal transceivers 101 and 102. As a matter of course, a transmission band for each of these two optical signals 401 and 402 is still maintained in a same manner as in the normal state.

Likewise, if the failure has occurred in the optical fiber transmission line 302, both the optical signals 401 and 402 are transmitted through the optical fiber transmission line 301.

As described above, in the optical network system having a pair of optical signal transceivers placed so as to face each other with bidirectional-type optical fiber transmission lines being interposed between the optical signal transceivers of the first embodiment, a wavelength of an optical signal 401 to be transmitted from an optical signal transmitting section 111 of an optical signal transceiver 101 through an optical fiber transmission line 301 is made different from that of an optical signal 402 to be transmitted from an optical signal transmitting section 112 of an optical signal transceiver 102 through an optical fiber transmission line 302. If a failure occurs in either of the optical fiber transmission lines, the signal protection switches do switching so that both the optical signals can be normally transmitted through another optical fiber transmission line in which no failure has occurred. This can achieve a satisfactory signal protection function which leads to high reliability in the optical network system. This also enables the optical network system to be constructed at low costs by using two pieces of optical fiber transmission lines, two optical signal transceivers, and two optical signal receivers.

Moreover, in the above first embodiment, a transmission rate of 10 G bps is employed as an example. However, the present invention is not limited to this and any transmission rate may be used. Particularly, if the present invention is applied to an optical signal transceiver which transmits and receives an optical signal at high speed, reduction in costs can be achieved effectively and the optical signal transceiver can operate efficiently.

Moreover, the optical signal transceiver and signal protection switches employed in the first embodiment can be constructed integrally as a node or separately and each component can be constructed as an independent part.

Second Embodiment

Figure 5:
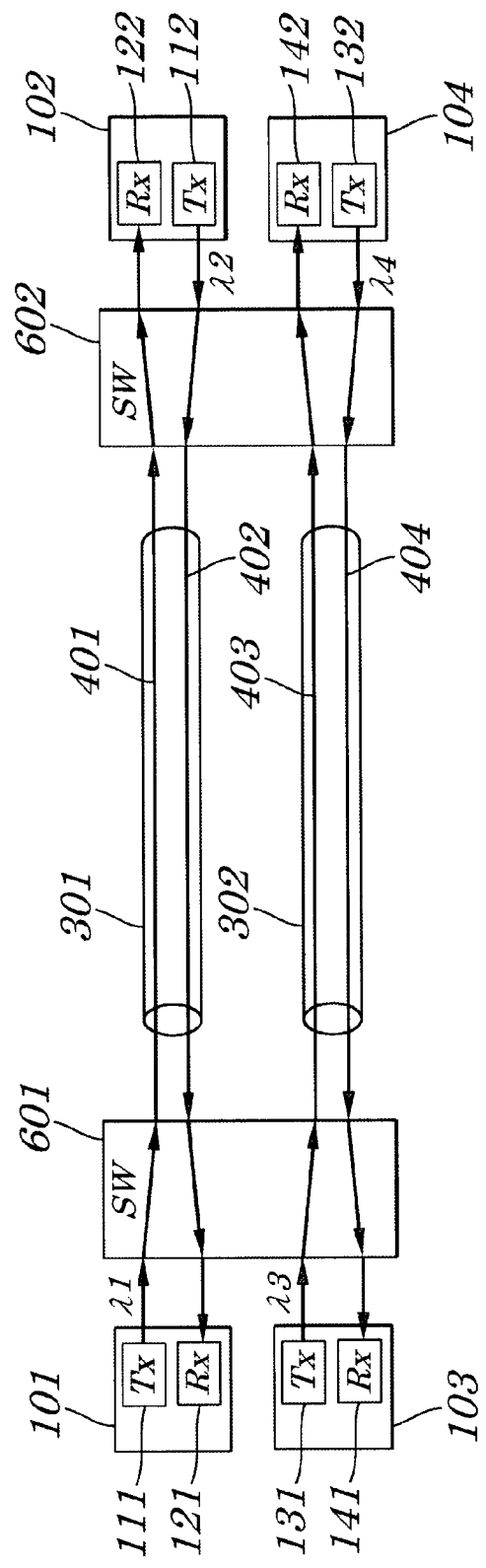
FIG. 5 is a block diagram showing configurations of an optical network system according to a second embodiment of the present invention.

FIG. 5 is a block diagram showing configurations of an optical network system according to a second embodiment of the present invention. As shown in FIG. 5, the optical network system of the second embodiment is made up of optical signal transceivers 101, 102, 103, and 104, signal protection switches 601 and 602, and optical fiber transmission lines 301 and 302.

Each of the optical fiber transmission lines 301 and 302 is installed separately in a different path. Therefore, there is almost no case in which a failure occurs in both the optical fiber transmission lines 301 and 302 at a same time.

Configurations of the optical signal transceivers 101, 102, 103, and 104 are the same. The optical signal transceivers 101 and 102 are placed in a manner so as to face each other and transmit and receive optical signals to and from each other. Likewise, the optical signal transceivers 103 and 104 are placed in a manner so as to face each other and transmit and receive optical signals to and from each other.

The optical signal transceiver 101 has an optical signal transmitting section 111 and an optical signal receiving section 121. The optical signal transceiver 102 has an optical signal transmitting section 112 and an optical signal receiving section 122. The optical signal transceiver 103 has an optical signal transmitting section 131 and an optical signal receiving section 141. The optical signal transceiver 104 has an optical signal transmitting section 132 and an optical signal receiving section 142.

Each of the optical signal transmitting sections 111, 112, 131, and 132 transmits a high-speed optical signal reaching a transmission speed of, for example, 10 G bps. Each of the optical signal receiving sections 121, 122, 141, and 142 can receive an optical signal reaching a transmission speed of, for example, 10 G bps.

In the example employed in the second embodiment, a wavelength "λ1" of light transmitted by the optical signal transmitting section 111 is 1536.61 nm. A wavelength "λ2" of light transmitted by the optical signal transmitting section 112 is 1539.77 nm. A wavelength "λ3" of light transmitted by the optical signal transmitting section 131 is 1555.75 nm. A wavelength "λ4" of light transmitted by the optical signal transmitting section 132 is 1558.98 nm. That is, wavelengths of the light to be transmitted by each of the optical signal transceivers 101, 102, 103, and 104 are made different from one another.

The signal protection switches 601 and 602 have a same configuration and are constructed in a manner so as to face each other with the optical fiber transmission lines 301 and 302 being interposed between the signal protection switches 601 and 602.

The signal protection switch 601 sends out an optical signal 401 transmitted from the optical signal transceiver 101 to the optical fiber transmission line 301 or 302 and an optical signal 403 transmitted from the optical signal transceiver 103 to the optical fiber transmission line 301 or 302.

Moreover, the signal protection switch 601 sends out an optical signal 402 having been received from the optical fiber transmission line 301 or 302 to the optical signal transceiver 101 and an optical signal 404 having been received from the optical fiber transmission line 301 or 302 to the optical signal transceiver 103.

Likewise, the signal protection switch 602 sends out the optical signal 402 transmitted from the optical signal transceiver 102 to the optical fiber transmission line 301 or 302 and the optical signal 404 transmitted from the optical signal transceiver 104 to the optical fiber transmission line 301 or 302.

Also, the signal protection switch 602 sends out the optical signal 402 having been received from the optical fiber transmission line 301 or 302 to the optical signal transceiver 102 and the optical signal 404 having been received from the optical fiber transmission line 301 or 302 to the optical signal transceiver 104.

Figure 6A:
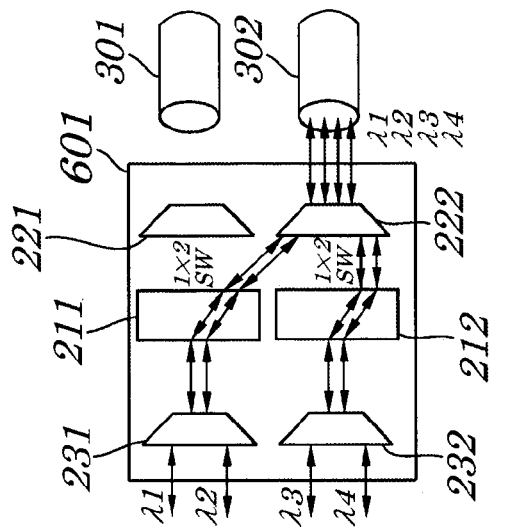
FIGS. 6A, 6B, and 6C are diagrams explaining configurations and operations of a signal protection switch of the second embodiment of the present invention.
Figure 6B:
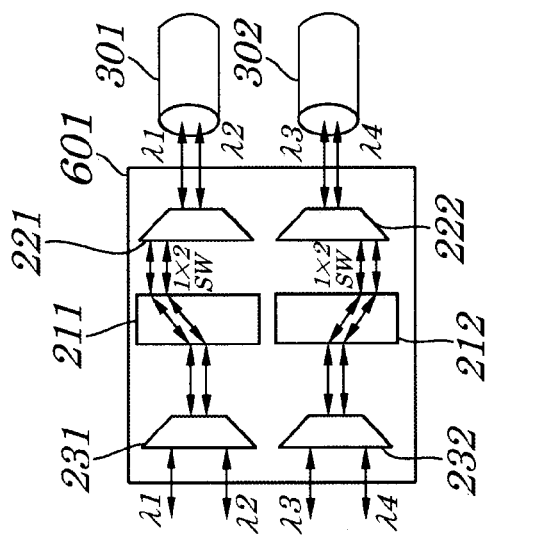
Figure 6C:
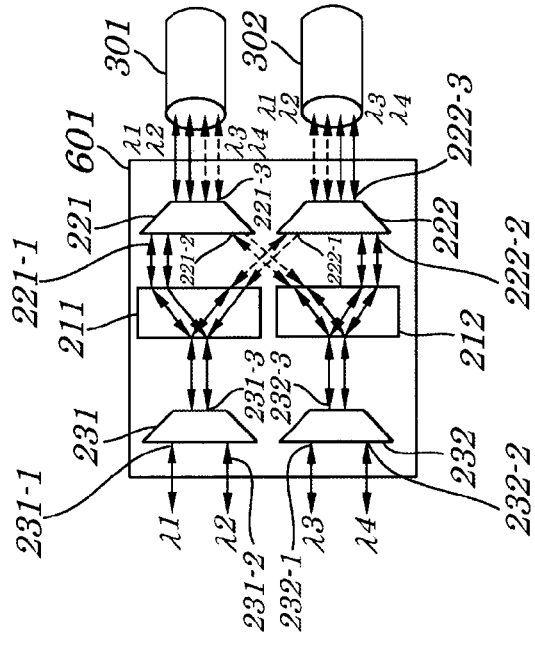

FIGS. 6A, 6B, and 6C are diagrams explaining configurations and operations of the signal protection switch of the second embodiment of the present invention. Here, the configurations and operations of the signal protection switch 601 are illustrated as an example. However, the signal protection switch 602 has same configurations and performs same operations as the signal protection switch 601. FIG. 6A is a block diagram showing configurations of the signal protection switch of the second embodiment of the present invention.

As shown in FIG. 6A, the signal protection switch 601 has optical switches 211 and 212, optical multiplexing and demultiplexing devices 221, 222, 231, and 232.

The optical multiplexing and demultiplexing devices 231 and 232 are a narrow-band type optical multiplexing and demultiplexing device.

The optical multiplexing and demultiplexing device 231 has input and output ports 231-1, 231-2, and 231-3. The input and output port 231-1 is connected to an optical signal transmitting section 111 of the optical signal transceiver 101. The input and output port 231-2 is connected to an optical signal receiving section 121 of the optical signal transceiver 101. The input and output port 231-3 is connected to the optical switch 211.

The optical multiplexing and demultiplexing device 232 has input and output ports 232-1, 232-2, and 232-3. The input and output port 232-1 is connected to an optical signal transmitting section 131 of the optical signal transceiver 103. The input and output port 232-2 is connected to an optical signal receiving section 141 of the optical signal transceiver 103. The input and output port 232-3 is connected to the optical switch 212.

The optical multiplexing and demultiplexing device 231 allows light with a wavelength "$\lambda 1$" to be transmitted between the input and output ports 231-1 and the input and output ports 231-3. Also, the optical multiplexing and demultiplexing device 231 allows light with a wavelength "$\lambda 2$" to be transmitted between the input and output ports 231-2 and the input and output ports 231-3.

The optical multiplexing and demultiplexing device 232 allows light with a wavelength "$\lambda 3$" to be transmitted between the input and output ports 232-1 and the input and output ports 232-3. Also, the optical multiplexing and demultiplexing device 232 allows light with a wavelength "$\lambda 4$" to be transmitted between the input and output ports 232-2 and the input and output ports 232-3.

Figure 7:
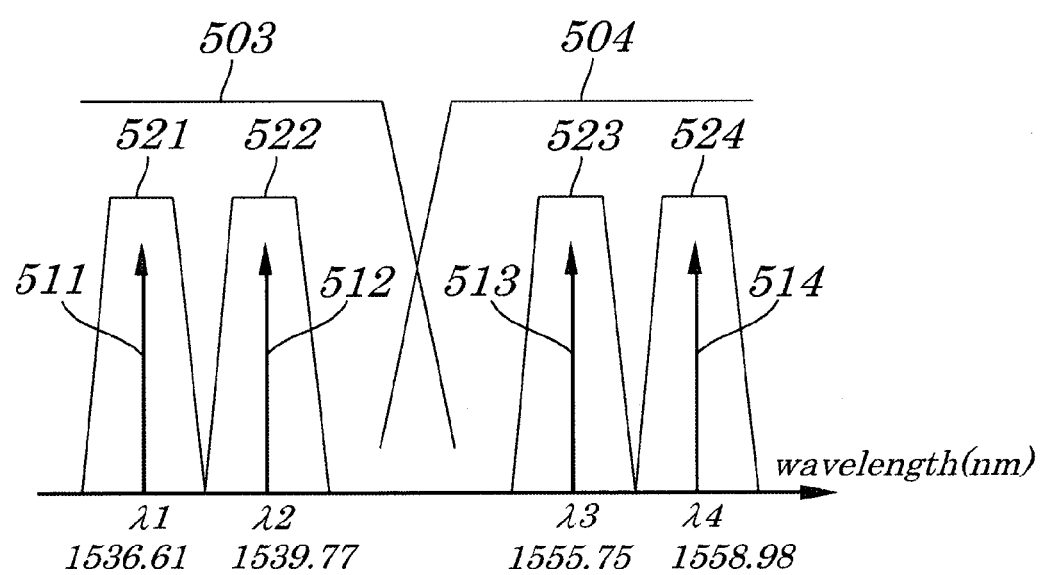
FIG. 7 is a diagram showing an optical transmission characteristic of an optical multiplexing and demultiplexing device of the second embodiment of the present invention.

FIG. 7 is a diagram showing an optical transmission characteristic of an optical multiplexing and demultiplexing device of the second embodiment of the present invention.

As shown in FIG. 7, an optical transmission characteristic between the input and output ports 231-1 and the input and output ports 231-3 is illustrated as a transmission characteristic 521. Also, an optical transmission characteristic between the input and output ports 231-2 and the input and output ports 231-3 is illustrated as a transmission characteristic 522.

Isolation between the input and output port 231-1 allowing an optical signal 511 with a wavelength of "$\lambda 1$" to be transmitted and the input and output port 231-2 allowing an optical signal 512 with a wavelength of "$\lambda 2$" to be transmitted is 35 dB or more. Also, directivity between them is 50 dB or more Likewise, the optical transmission characteristic between the input and output ports 232-1 and the input and output ports 232-3 is illustrated as a transmission characteristic 523. An optical transmission characteristic between the input and output ports 232-2 and the input and output ports 232-3 is illustrated as a transmission characteristic 524.

Isolation between the input and output port 232-1 allowing an optical signal 513 with a wavelength of "$\lambda 4$" to be transmitted and the input and output port 232-2 allowing an optical signal 514 with a wavelength of "$\lambda 4$" to be transmitted is 35 dB or more. Also, directivity between them is 50 dB or more The optical switch 211 selects either of the optical multiplexing and demultiplexing device 221 or 222 to allow either of them to be connected to the input and output port 231-3 of the optical multiplexing and demultiplexing device 231. The optical switch 212 selects either of the optical multiplexing and demultiplexing device 221 or 222 to allow either of them to be connected to the input and output port 232-3 of the optical multiplexing and demultiplexing device 232. The solid-line arrow shown in FIG. 6A illustrates a route which is selected in an ordinary state to transmit an optical signal. The dashed-line arrow shown in FIG. 6A illustrates a route which is selected when a failure occurs in the optical fiber transmission line 301 or 302 and through which an optical signal can be also transmitted.

FIG. 6B is a diagram illustrating a state of selection of the optical switch in an ordinary state. As shown in FIG. 6A, the optical switch 211 selects the optical multiplexing and demultiplexing device 221 and the optical switch 212 selects the optical multiplexing and demultiplexing device 222.

FIG. 6C is a diagram illustrating selection by an optical switch in a state in which a failure has occurred in the optical fiber transmission line 301. As shown in FIG. 2C, the optical switch 211 and optical switch 212 select the optical multiplexing and demultiplexing device 222. Likewise, in a state in which a failure has occurred in the optical fiber transmission line 302, the optical switch 211 and optical switch 212 select the optical multiplexing and demultiplexing device 212.

The optical multiplexing and demultiplexing device 221 has input and output ports 221-1, 221-2, and 221-3. The input and output port 221-1 is connected to the optical switch 211. The input and output port 221-2 is connected to the optical switch 212. The input and output port 221-3 is connected to the optical fiber transmission line 301.

Likewise, the optical multiplexing and demultiplexing device 222 has input and output ports 222-1, 222-2, and 222-3. The input and output port 222-1 is connected to the optical switch 211. The input and output port 222-2 is connected to the optical switch 212. The input and output port 222-3 is connected to the optical fiber transmission line 302.

The optical multiplexing and demultiplexing devices 221 and 222 allow light with a wavelength "λ1" and a wavelength "λ2" to be transmitted between each of the input and output ports 221-1 and 222-1 and each of the input and output ports 221-3 and 222-3. Also, the optical multiplexing and demultiplexing devices 221 and 222 allow light with a wavelength "λ3" and a wavelength "λ4" to be transmitted between each of the input and output ports 221-2 and 222-2 and each of the input and output ports 221-3 and 222-3.

As shown in FIG. 7, an optical transmission characteristic between the input and output ports 221-1 and 222-1 and the input and output ports 221-3 and 222-3 is illustrated as a transmission characteristic 503. Also, an optical transmission characteristic between the input and output ports 221-1 and 222-2 and the input and output ports 221-3 and 222-3 is illustrated as a transmission characteristic 504.

Isolation between arbitrary two ports out of the input and output ports 221-1 and 222-1 allowing the optical signal 511 with a wavelength "λ1" and the optical signal 512 with a wavelength "λ2" to be transmitted and between the input and output port 221-2 and 222-2 allowing the optical signal 513 with a wavelength "λ3" and an optical signal 514 with a wavelength "λ4" to be transmitted is 35 dB or more. Also, directivity between the arbitrary two ports as described above is 50 dB or more.

Next, flows of operations of the optical network system of the second embodiment are described.

In a state in which no failure has occurred in the optical fiber transmission line 301 and in the optical fiber transmission line 302, as shown in FIG. 5, the optical signal 401 transmitted by the optical signal transceiver 101 is transmitted through the optical fiber transmission line 301 and is received by the optical signal transceiver 102. Also, the optical signal 402 transmitted by the optical signal transceiver 102 is transmitted through the optical fiber transmission line 301 and is received by the optical signal transceiver 101. The optical signal 403 transmitted by the optical signal transceiver 103 is transmitted through the optical fiber transmission line 302 and is received by the optical signal transceiver 104. Moreover, the optical signal 404 sent out by the optical signal transceiver 104 is transmitted through the optical fiber transmission line 302 and is received by the optical signal transceiver 103.

Figure 8:
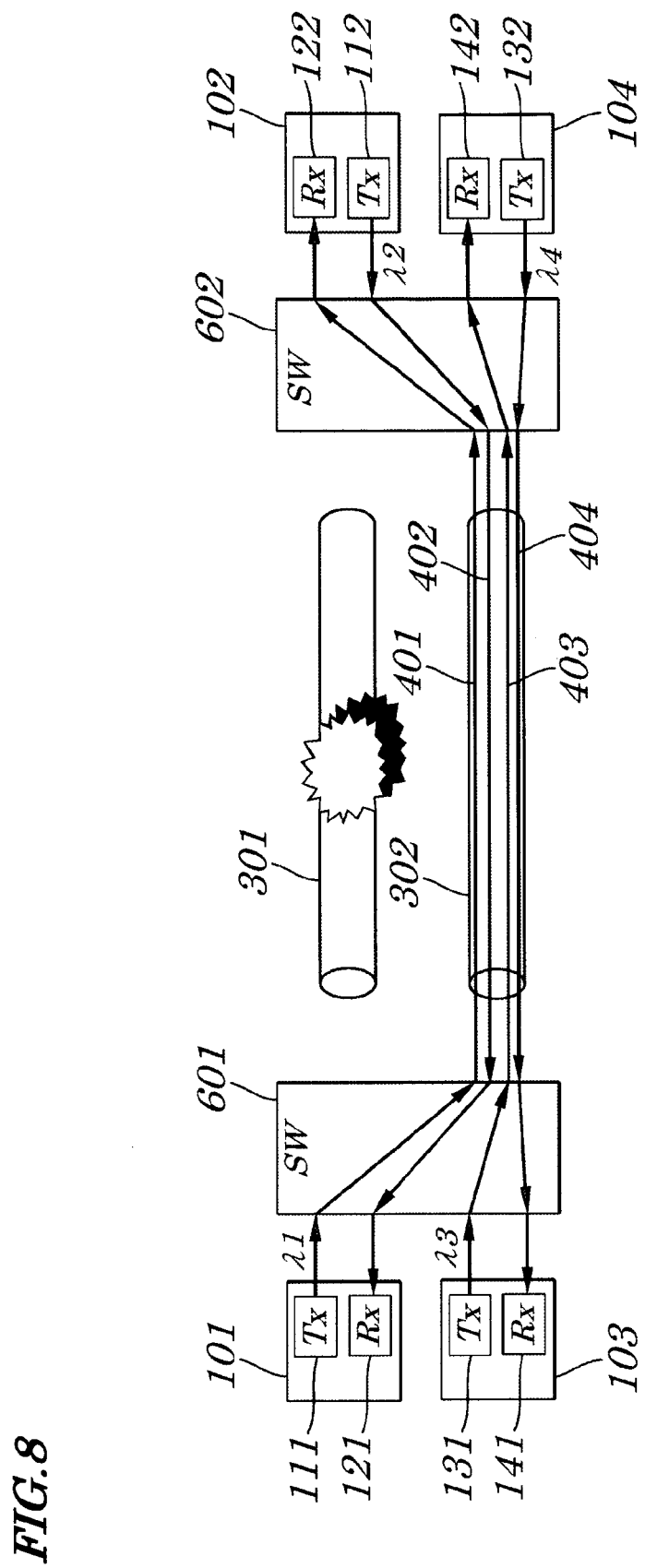
FIG. 8 is a diagram explaining operations of the optical network system of the second embodiment of the present invention.

FIG. 8 is a diagram explaining operations of the optical network system of the second embodiment of the present invention. In the example, as shown in FIG. 8, let it be assumed that the failure caused by breakage of an optical fiber, degradation in characteristics or a like has occurred in the optical fiber transmission line 301.

If the failure occurs in the optical fiber transmission line 301, as shown in FIG. 8, switching is done so that optical signals 401 and 402 that had been transmitted through the optical fiber transmission line 301 in an ordinary state begin to be transmitted through the optical fiber transmission line 302. That is, all the optical signals 401, 402, 403, and 404 are transmitted through one optical fiber transmission line 302. Since wavelengths of the optical signals 401, 402, 403, and 404 are made different from one another, all the optical signals 401, 402, 403, and 404 can be fully isolated from one another by the optical multiplexing and demultiplexing device 222 and, therefore, the optical signals 401, 402, 403, and 404 are normally transmitted between the optical signal transceivers 101 and 103 and all optical signal transceivers 102 and 104. As a matter of course, a transmission band for each of the optical signals 401, 402, 403, and 404 is still maintained in a same manner as in the ordinary state.

Likewise, if the failure has occurred in the optical fiber transmission line 302, all the optical signals 401, 402, 403, and 404 are transmitted through the optical fiber transmission line 301.

As described above, in the optical network system having a pair of optical signal transceivers placed in a manner so as to face each other with bidirectional-type optical signal communication lines being interposed between the optical signal transceivers of the second embodiment, a wavelength of the optical signal 401 to be transmitted from the optical signal transceiver 101, a wavelength of the optical signal 402 to be transmitted from the optical signal transceiver 102, a wavelength of the optical signal 403 to be transmitted from the optical signal transceiver 103, and a wavelength of the optical signal 404 to be transmitted from the optical signal transceiver 104 are made different from one another. If the failure occurs in either of the optical fiber transmission lines 301 or 302, the signal protection switches 601 and 602 do switching so that all the optical signals 401, 402, 403, and 404 can be transmitted normally through another optical fiber transmission line (either 301 or 302) in which no failure has occurred. This can achieve a satisfactory signal protection function which leads to high reliability in the optical network system. This also enables the optical network system to be constructed at low costs by using two pieces of optical fiber transmission lines (301 and 302), four optical signal transceivers 101, 102, 103, 104, and four optical signal receiver sections 121, 122, 141, 142.

Third Embodiment

Figure 9:
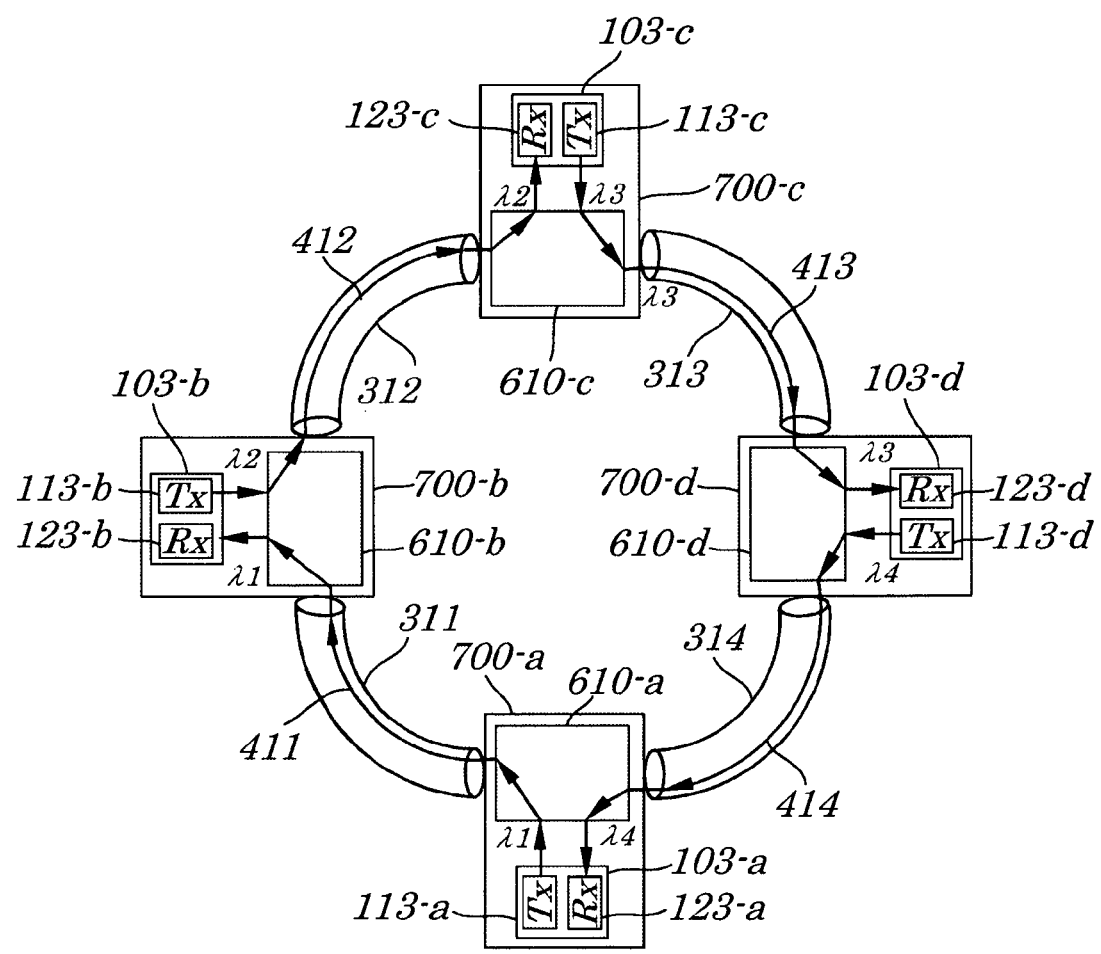
FIG. 9 is a block diagram showing configurations of an optical network system according to a third embodiment of the present invention.

FIG. 9 is a block diagram showing configurations of an optical network system according to a third embodiment of the present invention. As shown in FIG. 9, the optical network system of the third embodiment is a ring-type network having communication nodes 700-a, 700-b, 700-c, and 700-d and the optical fiber transmission lines 311, 312, 313, and 314.

The optical network system of the third embodiment has a function of having, if a failure occurs in any one of optical fiber transmission lines 311, 312, 313, or 314, an optical signal that had been transmitted through the optical fiber transmission line 311, 312, 313, or 314 in which the failure occurred begin to be transmitted in an optical fiber transmission line (311, 312, 313, or 314) placed in a ring in a reverse direction to bypass the optical fiber transmission line 311, 312, 313, or 314 in which the failure has occurred.

All the communication nodes 700-a, 700-b, 700-c, and 700-d have a same configuration and only a wavelength of light to be transmitted and to be received by each of them is made different. Each of communication nodes 700-a, 700-b, 700-c, and 700-d has an Add/Drop function. The Add/Drop function represents a function of inserting data into an optical fiber transmission and of taking out data from the optical fiber transmission.

The communication node 700-a has an optical signal transceiver 103-a and a signal protection switch 610-a. The optical signal transceiver 103-a has an optical signal transmitting section 113-a and an optical signal receiving section 123-a. The communication node 700-b has an optical signal transceiver 103-b and a signal protection switch 610-b. The optical signal transceiver 103-b has an optical signal transmitting section 113-b and an optical signal receiving section 123-b. The communication node 700-c has an optical signal transceiver 103-c and a signal protection switch 610-c. The optical signal transceiver 103-c has an optical signal transmitting section 113-c and an optical signal receiving section 123-c. The communication node 700-d has an optical signal transceiver 103-*d* and a signal protection switch 610-*d*. The optical signal transceiver 103-*d* has an optical signal transmitting section 113-*d* and an optical signal receiving section 123-*d*.

Each of the optical signal transmitting sections 113-*a*, 113-*b*, 113-*c*, and 113-*d* transmits a high-speed optical signal reaching a transmission speed of, for example, 10 G bps. Each of the optical signal receiving sections 123-*a*, 123-*b*, 123-*c*, and 123-*d* can receive a high-speed optical signal reaching a transmission speed of, for example, 10 G bps.

A wavelength "λ1" of an optical signal 411 sent out from the optical signal transmitting section 113-*a* of the communication node 700-*a*, then transmitted through the optical fiber transmission line 311 and received by the optical signal receiving section 123-*b* of the communication node 700-*b* is 1536.61 nm. A wavelength "λ2" of an optical signal 412 sent out from the optical signal transmitting section 113-*b* of the communication node 700-*b*, then transmitted through the optical fiber transmission line 312 and received by the optical signal receiving section 123-*c* of the communication node 700-*c* is 1539.77 nm. A wavelength "λ3" of an optical signal 413 sent out from the optical signal transmitting section 113-*c* of the communication node 700-*c*, then transmitted through the optical fiber transmission line 313 and received by the optical signal receiving section 123-*d* of the communication node 700-*d* is 1555.75 nm. A wavelength "λ4" of an optical signal 414 sent out from the optical signal transmitting section 113-*d* of the communication node 700-*d*, then transmitted through the optical fiber transmission line 314 and received by the optical signal receiving section 123-*a* of the communication node 700-*a* is 1558.98 nm.

The signal protection switches 610-*a*, 610-*b*, 610-*c*, and 610-*d* have a same configuration and are connected in a ring-shaped manner by the optical fiber transmission lines 311, 312, 313, and 314.

The signal protection switch 610-*a* transmits the optical signal 411 sent out from the optical signal transceiver 103-*a* to the optical fiber transmission line 311 or the optical fiber transmission line 314. Moreover, the signal protection switch 610-*a* transmits the optical signal 414 having been received from the optical fiber transmission line 311 or 314 to the optical signal transceiver 113-*a*.

Also, the signal protection switch 610-*a* relays the optical signal 412 sent from the optical signal transceiver 103-*b* of the communication node 700-*b* to transfer it from the optical fiber transmission line 311 to the optical fiber transmission line 314. Likewise, the signal protection switch 610-*a* relays the optical signal 413 sent from the optical signal transceiver 103-*c* of the communication node 700-*c* to transfer it from the optical fiber transmission line 311 to the optical fiber transmission line 314.

Similarly, the signal protection switch 610-*b* transmits the optical signal 412 sent from the optical signal transceiver 103-*b* to the optical fiber transmission line 312 or 311. The signal protection switch 610-*b* transmits the optical signal 411 having been received from the optical fiber transmission line 312 or 311 to the optical signal transceiver 113.

The signal protection switch 610-*b* relays the optical signal 413 sent out from the optical signal transceiver 103-*c* of the communication node 700-*c* to transfer it from the optical fiber transmission line 312 to the optical fiber transmission line 311. The signal protection switch 610-*b* relays the optical signal 414 sent out from the optical signal transceiver 103-*d* of the communication node 700-*d* to transfer it from the optical fiber transmission line 312 to the optical fiber transmission line 311.

Likewise, the signal protection switch 610-*c* transmits the optical signal 413 sent out from the optical signal transceiver 103-*c* to the optical fiber transmission line 313 or 312. Also, the signal protection switch 610-*c* transmits the optical signal 412 having been received from the optical fiber transmission line 313 or 312 to the optical signal transceiver 113-*c*.

The signal protection switch 610-*c* relays the optical signal 414 sent out from the optical signal transceiver 103-*d* of the communication node 700-*d* to transfer it from the optical fiber transmission line 313 to the optical fiber transmission line 312. The signal protection switch 610-*c* relays the optical signal 411 sent from the optical signal transceiver 103-*a* of the communication node 700-*a* to transfer it from the optical fiber transmission line 313 to the optical fiber transmission line 312.

Likewise, the signal protection switch 610-*d* transmits the optical signal 414 sent from the optical signal transceiver 103-*d* to the optical fiber transmission line 314 or 313. Furthermore, the signal protection switch 610-*d* transmits the optical signal 413 having been received from the optical fiber transmission line 314 or 313 to the optical signal transceiver 113-*d*.

The signal protection switch 610-*d* relays the optical signal 411 sent from the optical signal transceiver 103-*a* of the communication node 700-*a* to transfer it from the optical fiber transmission line 314 to the optical fiber transmission line 313. Also, the signal protection switch 610-*d* relays the optical signal 412 sent from the optical signal transceiver 103-*b* of the communication node 700-*b* to transfer it from the optical fiber transmission line 314 to the optical fiber transmission line 313.

FIGS. 10A, 10B, 10C, 10D, 10E, and 10F are diagrams explaining configurations and operations of the signal protection switch 610-*c* of the third embodiment of the present invention. FIG. 10A is a block diagram illustrating configurations of the signal protection switch 610-*c* of the third embodiment. Here, as an example, configurations of the signal protection switch 610-*c* are shown, however, configurations of other signal protection switches 610-*a*, 610-*b*, 610-*d* are the same.

As shown in FIG. 10A, the signal protection switch 610-*c* has optical switches 211 and 212 and optical multiplexing and demultiplexing devices 241 and 242.

The optical multiplexing and demultiplexing devices 241 and 242 are a narrow-band type optical multiplexing and demultiplexing device.

Figure 11:
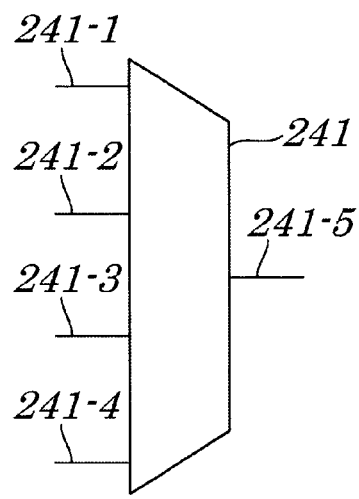
FIG. 11 is a diagram illustrating an input and output port of an optical multiplexing and demultiplexing device of the third embodiment of the present invention.

FIG. 11 is a diagram illustrating an input and output port of the optical multiplexing and demultiplexing device 241 of the third embodiment.

As shown in FIG. 11, the optical multiplexing and demultiplexing device 241 has five input and output ports 241-1 to 241-5. In FIG. 11, as an example, the optical multiplexing and demultiplexing device 241 is shown, however, the optical multiplexing and demultiplexing device 242 has same configurations. The optical multiplexing and demultiplexing device 242 has five input and output ports 242-1 to 242-5 (not shown).

As shown in FIG. 10A, the input and output port 241-1 is connected to the optical switch 211. The input and output port 241-2 is connected to the input and output port 242-3 of the optical multiplexing and demultiplexing device 242. The input and output port 241-3 is connected to the input and output port 242-2 of the optical multiplexing and demultiplexing device 242. The input and output port 241-4 is connected to the optical switch 212. The input and output port 241-5 is connected to the optical fiber transmission line 313.

The input and output port 242-1 of the optical multiplexing and demultiplexing device 242 is connected to the optical switch 211. The input and output port 242-4 is connected to the optical switch 212. The input and output port 242-5 is connected to the optical fiber transmission line 312.

The optical multiplexing and demultiplexing devices 241 and 242 allow light with a wavelength "λ3" to be transmitted between each of the input and output ports 241-1 and 242-1 and each of the input and output ports 241-5 and 242-5. The optical multiplexing and demultiplexing devices 241 and 242 allow light with a wavelength "λ4" to be transmitted between each of the input and output ports 241-2 and 242-3 and each of the input and output ports 241-5 and 242-5. The optical multiplexing and demultiplexing devices 241 and 242 allow light with a wavelength "λ1" to be transmitted between each of the input and output ports 241-3 and 242-2 and each of the input and output ports 241-5 and 242-5. The optical multiplexing and demultiplexing devices 241 and 242 allow light with a wavelength "λ2" to be transmitted between each of the input and output ports 241-4 and 242-4 and each of the input and output ports 241-5 and 242-5.

Figure 12:
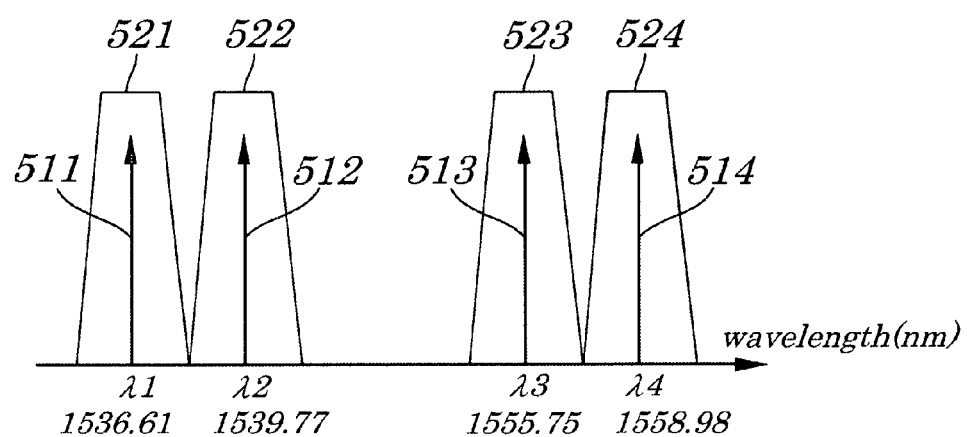
FIG. 12 is a diagram showing an optical transmission characteristic of the optical multiplexing and demultiplexing device of the third embodiment of the present invention.

FIG. 12 is a diagram showing an optical transmission characteristic of the optical multiplexing and demultiplexing device of the third embodiment of the present invention. As shown in FIG. 12, an optical transmission characteristic between each of the input and output ports 241-1 and 242-1 and each of the input and output ports 241-5 and 242-5 is illustrated as a transmission characteristic 523. Also, an optical transmission characteristic between each of the input and output ports 241-2 and 242-3 and each of the input and output ports 241-5 and 242-5 is illustrated as a transmission characteristic 524. An optical transmission characteristic between each of the input and output ports 241-3 and 242-2 and each of the input and output ports 241-5 and 242-5 is illustrated as a transmission characteristic 521. Also, an optical transmission characteristic between each of the input and output ports 241-4 and 242-4 and each of the input and output ports 241-5 and 242-5 is illustrated as a transmission characteristic 522.

Isolation between arbitrary two ports out of the input and output ports 241-1 or 242-2 allowing an optical signal 511 with a wavelength "λ1" to be transmitted and the input and output port 241-2 or 242-2 allowing the optical signal 513 with a wavelength "λ2" to be transmitted and the input and output ports 241-1 or 242-1 allowing the optical signal 513 with a wavelength "λ3" to be transmitted and the input and output ports 241-2 or 242-3 allowing an optical signal 514 with a wavelength "λ3" to be transmitted is 35 dB or more. Also, directivity between the arbitrary two ports as described above is 50 dB or more.

The optical switch 211 selects the optical multiplexing and demultiplexing device 241 or 242 to allow either of them to be connected to the optical signal transmitting section 113-c of the optical signal transceiver 103-c. The optical switch 212 selects the optical multiplexing and demultiplexing device 241 or 242 to allow either of them to be connected to the optical signal receiving section 123-c of the optical signal transceiver 103-c. The solid-line arrow shown in FIG. 10A illustrates a route which is selected in an ordinary state to transmit an optical signal. The dashed-line arrow shown in FIG. 10A illustrates a route which is selected when a failure occurs in an optical fiber transmission line and through which an optical signal can be also transmitted.

FIG. 10B is a diagram illustrating a state of selection by the optical switches 211, 212 in an ordinary state. As shown in FIG. 10B, the optical switch 211 selects the optical multiplexing and demultiplexing device 221 and the optical switch 212 selects the optical multiplexing and demultiplexing device 222.

FIG. 10C is a diagram illustrating selection by the optical switches 211 or 212 in a state in which the failure has occurred in the optical fiber transmission line 313. The optical fiber transmission line 313 is a communication line through which the communication node 700-c transmits the optical signal 413 in an ordinary state. Here, since the failure has occurred in the optical fiber transmission line 313, the communication node 700-c has the optical signal 413 be transmitted in a reverse direction to bypass the optical fiber transmission line 313. As a result, as shown in FIG. 10C, the optical switches 211 and 212 select the optical multiplexing and demultiplexing device 242.

Similarly, in a state where the failure has occurred in the optical fiber transmission line 312, the optical switches 211 and 212 select the optical multiplexing and demultiplexing device 241.

Next, flows of operations of the optical network system of the third embodiment of the present invention are described.

In an ordinary state where no failure has occurred in any of the optical fiber transmission lines 311, 312, 313, and 314, as shown in FIG. 9, an optical signal is transmitted in a clockwise direction between communication nodes 700-a, 700-b, 700-c, 700-d being adjacent to each other.

Figure 13:
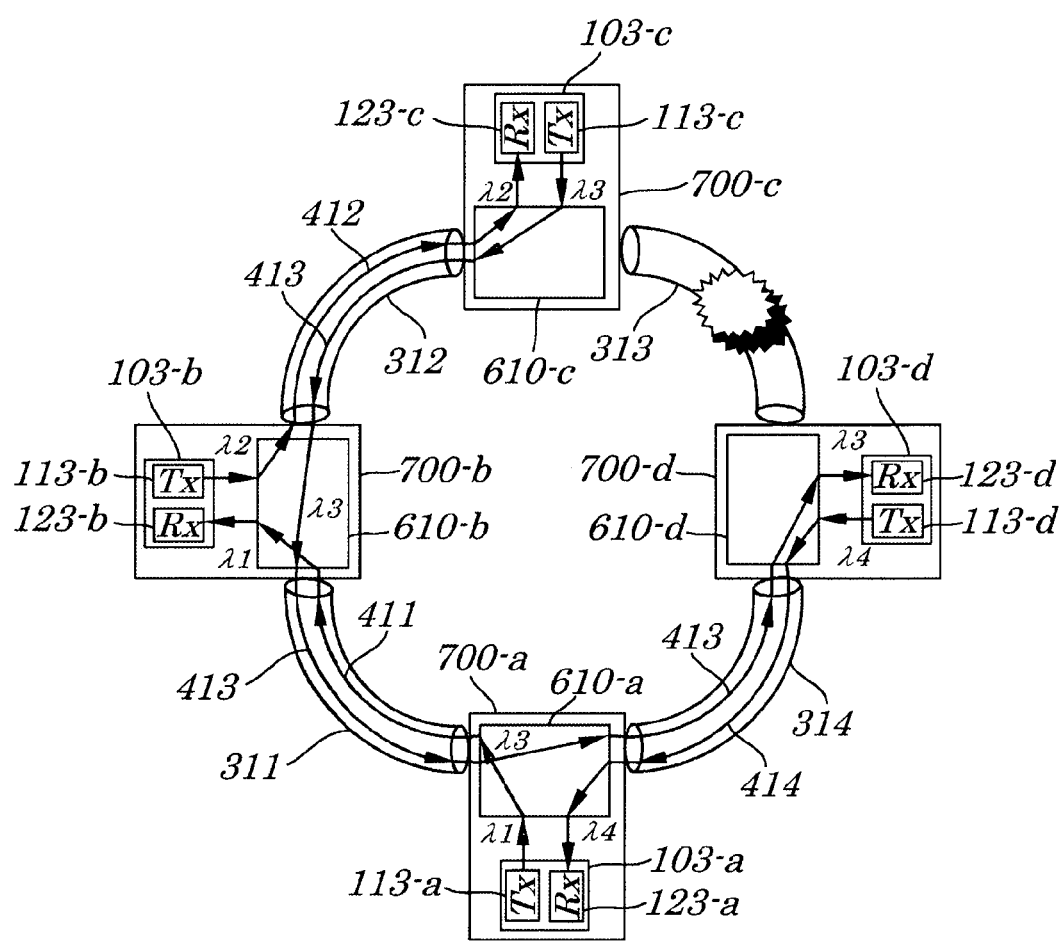
FIG. 13 is a diagram explaining operations of the optical network system of the third embodiment of the present invention.

FIG. 13 is a diagram explaining operations of the optical network system of the third embodiment of the present invention. In the example shown in FIG. 13, let it be assumed that the failure caused by breakage of a fiber, degradation in characteristics or a like has occurred in the optical fiber transmission line 313.

If the failure has occurred in the optical fiber transmission line 313, as shown in FIG. 13, switching is done so that an optical signal that had been transmitted through the optical fiber transmission line 313 in an ordinary state begins to be transmitted in a counterclockwise direction. That is, the communication node 700-c transmits an optical signal 413 to the optical fiber transmission line 413. At this point, the signal protection switch 610-c of the communication node 700-c does switching, as shown in FIG. 10C, so that the optical signal with a wavelength "λ3" is transmitted through the optical fiber transmission line 312.

The communication node 700-b relays the optical signal 413 to transfer it from the optical fiber transmission line 312 to the optical fiber transmission line 311. At this point, the signal protection switch 310-b, as shown in FIG. 10D, relays the optical signal with a wavelength "λ3" to transfer it from the optical fiber transmission line 312 to the optical fiber transmission line 311. The communication node 700-a relays the optical signal 413 to transfer it from the optical fiber transmission line 311 to the optical fiber transmission line 314. At this point, the signal protection switch 610-a of the communication node 700-a relays the optical signal with a wavelength "λ3" to transfer it from the optical fiber transmission line 311 to the optical fiber transmission line 314.

Then, the communication node 700-d receives the optical signal 413 from the optical fiber transmission line 314. At this point, the signal protection switch 610-d of the communication node 700-d, as shown in FIG. 10C, receives the optical signal 413 with a wavelength "λ3" from the optical fiber transmission line 314.

Since wavelengths of the optical signals 411, 412, 413, and 414 are different from one another, these optical signals 411, 412, 413, and 414 are completely isolated from one another by the optical multiplexing and demultiplexing device and therefore are normally transmitted. As a matter of course, a transmission band for each of these optical signals 411, 412, 413, and 414 is still maintained in a same manner as in the case of the ordinary state.

Likewise, if the failure occurs in other optical fiber transmission lines, switching is done so that the optical signal that had been transmitted through the optical fiber transmission lines in which the failure has occurred begins to be transmitted in a counterclockwise direction.

As described above, in the ring-type optical network system made up of communication nodes each having an optical signal transceiver and an optical signal receiver and of single-ring-shaped optical fiber transmission lines of the third embodiment, wavelengths of optical signals being transmitted between communication nodes adjacent to each other are made different from one another and, in an ordinary state, all optical signals are transmitted between communication nodes adjacent to each another in a clockwise direction. If the failure occurs in any one of the ring-type optical fiber transmission lines, the signal protection switches do switching so that an optical signal that had been transmitted through the optical fiber transmission line in which the failure has occurred begins to be transmitted in a counterclockwise direction to bypass the optical fiber transmission line in which the failure has occurred. This can achieve a satisfactory signal protection function which leads to high reliability in the optical network system. This also enables the ring-type optical network system to be constructed at low costs.

Fourth Embodiment

Figure 14:
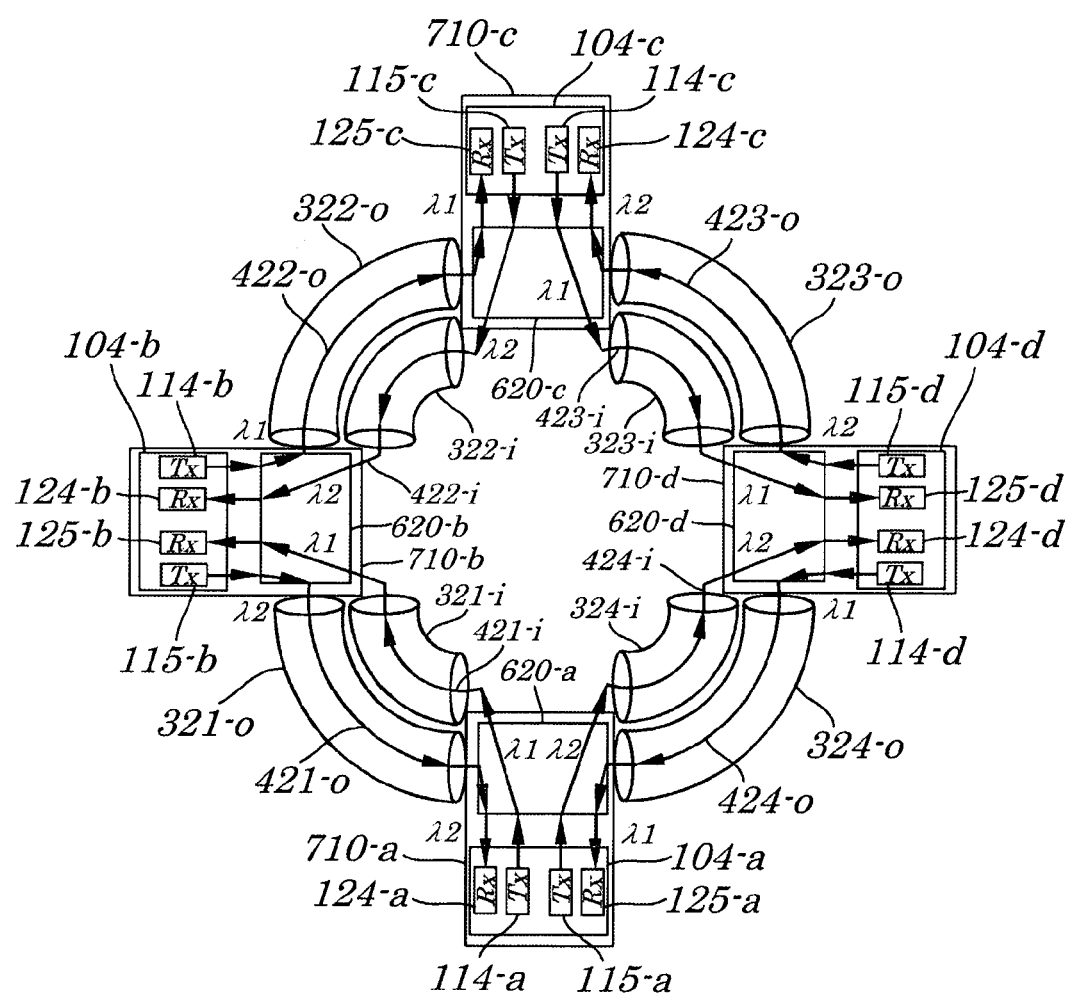
FIG. 14 is a block diagram showing configurations of an optical network system according to a fourth embodiment of the present invention.

FIG. 14 is a block diagram showing configurations of an optical network system according to a fourth embodiment of the present invention. As shown in FIG. 14, the optical network system of the fourth embodiment is a dual-ring-type network having communication nodes 710-*a*, 710-*b*, 710-*c*, and 710-*d* and optical fiber transmission lines 321-*i*, 321-*o*, 322-*i*, 322-*o*, 323-*i*, 323-*o*, 324-*i*, and 324-*o*.

Between the communication ode 710-*a* and the communication node 710-*b* are connected the optical fiber transmission line 321-*i* heading from the communication node 710-*a* for the communication node 710-*b* and the optical fiber transmission line 321-*o* heading from the communication node 10-*b* for the communication node 710-*a*.

Between the communication node 710-*b* and the communication node 710-*c* are connected the optical fiber transmission line 322-*o* heading from the communication node 710-*b* for the communication node 710-*c* and the optical fiber transmission line 322-*i* heading from the communication node 710-*c* for the communication-node 710-*b*.

Between the communication node 710-*c* and the communication node 710-*d* are connected the optical fiber transmission line 323-*i* heading from the communication node 710-*c* for the communication node 710-*d* and the optical fiber transmission line 323-*o* heading from the communication node 710-*d* for the communication node 710-*c*.

Between the communication node 710-*d* and the communication node 710-*a* are connected the optical fiber transmission line 324-*o* heading from the communication node 710-*d* for the communication node 710-*a* and the optical fiber transmission line 324-*i* heading from the node 710-*a* for the communication node 710-*d*.

Generally speaking, the optical network system of the fourth embodiment has two pieces of optical fiber transmission lines being connected between communication nodes and has a signal protection function that, if a failure occurs in either of the two optical fiber transmission lines, switching is done so that an optical signal that had been transmitted through the optical fiber transmission in which the failure has occurred begins to be transmitted through another optical fiber transmission line to bypass the optical fiber transmission line in which the failure has occurred.

All the communication nodes 710-*a*, 710-*b*, 710-*c*, and 710-*d* have same configurations and only a wavelength of light to be transmitted or to be received differs. Each of the communication nodes 710-*a*, 710-*b*, 710-*c*, and 710-*d* has an Add/Drop function. The Add/Drop function represents a function of inserting data into an optical fiber transmission and of taking out data from the optical fiber transmission.

The communication node 710-*a* has an optical signal transceiver 104-*a* and a signal protection switch 620-*a*. The optical signal transceiver 104-*a* has optical signal transmitting sections 114-*a* and 115-*a* and optical signal receiving sections 124-*a* and 125-*a*.

The communication node 710-*b* has an optical signal transceiver 104-*b* and a signal protection switch 620-*b*. The optical signal transceiver 104-*b* has optical signal transmitting sections 114-*b* and 115-*b* and optical signal receiving sections 124-*b* and 125-*b*.

The communication node 710-*c* has an optical signal transceiver 104-*c* and a signal protection switch 620-*c*. The optical signal transceiver 104-*c* has optical signal transmitting sections 114-*c* and 115-*c* and optical signal receiving sections 124-*c* and 125-*c*.

The communication node 710-*d* has an optical signal transceiver 104-*d* and a signal protection switch 620-*d*. The optical signal transceiver 104-*d* has optical signal transmitting sections 114-*d* and 115-*d* and optical signal receiving sections 124-*d* and 125-*d*.

Each of the optical signal transmitting sections 114-*a*, 115-*a*, 114-*b*, 115-*b*, 114-*c*, 115-*c*, 114-*d*, and 115-*d* transmits a high-speed optical signal reaching a transmission speed of, for example, 10 G bps. Each of the optical signal receiving sections 124-*a*, 125-*a*, 124-*b*, 125-*b*, 124-*c*, 125-*c*, 124-*d*, and 125-*d* can receive an optical signal reaching a transmission speed of, for example, 10 G bps.

A wavelength "$\lambda 1$" of an optical signal 421-*i* sent out from the optical signal transmitting section 114-*a* of the communication node 710-*a*, then transmitted through the optical fiber transmission line 321-*i* and received by an optical signal receiving section 125-*b* of the communication node 710-*b* is 1536.61 nm. A wavelength "$\lambda 2$" of an optical signal 421-*o* sent out from the optical signal transmitting section 115-*b* of the communication node 710-*b*, then transmitted through the optical fiber transmission line 321-*o* and received by the optical signal receiving section 124-*a* of the communication node 710-*a* is 1555.75 nm.

A wavelength "$\lambda 1$" of an optical signal 422-*o* sent out from the optical signal transmitting section 114-*b* of the communication node 710-*b*, then transmitted through the optical fiber transmission line 322-*o* and received by the optical signal receiving section 125-*c* of the communication node 710-*c* is 1536.61 nm. A wavelength "$\lambda 2$" of an optical signal 422-*i* sent out from the optical signal transmitting section 115-*c* of the communication node 710-*c*, then transmitted through the optical fiber transmission line 322-*i* and received by an optical signal receiving section 124-*b* of the communication node 710-*b* is 1555.75 nm.

A wavelength "$\lambda 1$" of an optical signal 423-*i* sent out from the optical signal transmitting section 114-*c* of the communication node 710-*c*, then transmitted through the optical fiber transmission line 323-*i* and received by an optical signal receiving section 125-*d* of the communication node 710-*d* is 1536.61 nm. A wavelength "$\lambda 2$" of an optical signal 423-*o* sent out from the optical signal transmitting section 115-*d* of the communication node 710-*d*, then transmitted through the optical fiber transmission line 323-*o* and received by an optical signal receiving section 124-*c* of the communication node 710-*c* is 1555.75 nm.

A wavelength "λ1" of an optical signal 424-*o* sent out from the optical signal transmitting section 114-*d* of the communication node 710-*d*, then transmitted through the optical fiber transmission line 324-*o* and received by an optical signal receiving section 125-*a* of the node 710-*a* is 1536.61 nm. A wavelength "λ2" of an optical signal 424-*i* sent out from the optical signal transmitting section 115-*a* of the communication node 710-*a*, then transmitted through the optical fiber transmission line 324-*i* and received by an optical signal receiving section 124-*d* of the communication node 710-*d* is 1555.75 nm.

All the signal protection switches 620-*a*, 620-*b*, 620-*c* and 620-*d* have a same configuration and are connected by optical fiber transmission lines 311, 312, 313, and 314 in a ring-shaped form.

The signal protection switch 620-*a* transmits the optical signal 424-*i* sent from the optical signal transmitting section 115-*a* to the optical fiber transmission line 324-*i* or 324-*o*. The signal protection switch 620-*a* transmits the optical signal 424-*o* having been received from the optical fiber transmission line 324-*i* or 324-*o* to the optical signal receiving section 125-*a*.

Also, the signal protection switch 620-*a* transmits the optical signal 421-*i* transmitted from the optical signal transmitting section 114-*a* to the optical fiber transmission line 321-*i* or 321-*o*. The signal protection switch 620-*a* transmits the optical signal 421-*o* having been received from the optical fiber transmission line 321-*i* or 321-*o* to the optical r signal receiving section 124-*a*.

The signal protection switch 620-*b* transmits the optical signal 424-*o* sent from the optical signal transmitting section 115-*b* to the optical fiber transmission line 321-*i* or 321-*o*. The signal protection switch 620-*b* transmits the optical signal 421-*i* having been received from the optical fiber transmission line 321-*i* or 321-*o* to the optical signal receiving section 125-*b*.

The signal protection switch 620-*b* transmits the optical signal 422-*o* sent from the optical signal transmitting section 114-*b* to the optical fiber transmission line 322-*i* or 322-*o*. The signal protection switch 620-*b* transmits the optical signal 422-*i* having been received from the optical fiber transmission line 322-*i* or 322-*o* to the optical signal receiving section 124-*b*.

The signal protection switch 620-*c* transmits the optical signal 422-*i* sent from the optical signal transmitting section 115-*c* to the optical fiber transmission line 322-*i* or 322-*o*. The signal protection switch 620-*c* transmits the optical signal 422-*o* having been received from the optical fiber transmission line 322-*i* or 322-*o* to the optical signal receiving section 125-*c*.

The signal protection switch 620-*c* transmits the optical signal 423-*i* sent from the optical signal transmitting section 114-*c* to the optical fiber transmission line 323-*i* or 323-*o*. The signal protection switch 620-*c* transmits the optical signal 423-*o* having been received from the optical fiber transmission line 323-*i* or 323-*o* to the optical signal receiving section 124-*c*.

The signal protection switch 620-*d* transmits the optical signal 423-*o* sent from the optical signal transmitting section 115-*d* to the optical fiber transmission line 323-*i* or 323-*o*. The signal protection switch 620-*d* transmits the optical signal 423-*i* having been received from the optical fiber transmission line 323-*i* or 323-*o* to the optical signal receiving section 125-*d*.

The signal protection switch 620-*d* transmits the optical signal 424-*o* sent from the optical signal transmitting section 114-*d* to the optical fiber transmission line 324-*i* or 324-*o*. The signal protection switch 620-*d* transmits the optical signal 424-*i* having been received from the optical fiber transmission line 324-*i* or 324-*o* to the optical signal receiving section 124-*d*.

FIGS. 15A, 15B, 15C, and 15D are diagrams explaining configurations and operations of the signal protection switch 620-*c* of the fourth embodiment of the present invention. FIG. 15A is a block diagram illustrating configurations of the signal protection switch 620-*c* of the fourth embodiment. Here, as an example, configurations of the signal protection switch 620-*c* is shown, however, configurations of other signal protection switches 620-*a*, 620-*b*, 620-*d* are the same.

As shown in FIG. 15A, the signal protection switch 620-*c* has optical switches 211, 212, 213, and 214 and optical multiplexing and demultiplexing devices 221, 222, 223, and 224.

The optical multiplexing and demultiplexing devices 221, 222, 223, and 224 are a narrow-band type optical multiplexing and demultiplexing device.

As shown in FIG. 15A, portions made up of optical switches 211 and 213 and optical multiplexing and demultiplexing devices 221 and 222 have same configurations as portions shown in the signal protection switch 201 of the first embodiment. Also, in FIG. 15A, portions made up of optical switches 213 and 214 and optical multiplexing and demultiplexing devices 223 and 224 have same configurations as portions shown in the signal protection switch 201 of the first embodiment. The optical switch 213 in FIG. 15A corresponds to the optical switch 211 in FIG. 2A and the optical switch 214 in FIG. 15A corresponds to the optical switch 212 in FIG. 2A. The optical multiplexing and demultiplexing device 223 in FIG. 15A corresponds to the optical multiplexing and demultiplexing device 221 in FIG. 2A and the optical multiplexing and demultiplexing device 224 in FIG. 15A corresponds to the optical multiplexing and demultiplexing device 222 in FIG. 2A. Each of the multiplexing and demultiplexing devices 221, 222, 223, and 224 has a same transmission characteristic as each of the multiplexing and demultiplexing devices shown in FIG. 3 have.

The optical switch 211 selects either of the optical multiplexing and demultiplexing device 221 or 222 to allow either of them to be connected to the optical signal transmitting section 114-*c* of the optical signal transceiver 104-*c*. The optical switch 212 selects either of the optical multiplexing and demultiplexing device 221 or 222 to allow either of them to be connected to the optical signal transmitting section 124-*c* of the optical signal transceiver 104-*c*.

The optical switch 213 selects either of the optical multiplexing and demultiplexing device 223 or 224 to allow either of them to be connected to the optical signal transmitting section 115-*c* of the optical signal transceiver 104-*c*. The optical switch 214 selects either of the optical multiplexing and demultiplexing device 223 or 224 to allow either of them to be connected to the optical signal transmitting section 125-*c* of the optical signal transceiver 104-*c*.

The solid-line arrow shown in FIG. 15A illustrates a route which is selected in an ordinary state to transmit an optical signal. The dashed-line-line arrow shown in FIG. 15A illustrates a route which is selected when the failure occurs in an optical fiber transmission line and through which an optical signal can be also transmitted.

FIG. 15B is a diagram illustrating a state of selection by an optical switch in an ordinary state. As shown in FIG. 15B, the optical switch 211 selects the optical multiplexing and demultiplexing device 221 and the optical switch 212 selects the optical multiplexing and demultiplexing device 222.

FIG. 15C is a diagram illustrating selection by each optical switch of the signal protection switch 620-c of the communication node 710-c in a state in which the failure has occurred in the optical fiber transmission line 323-o. FIG. 15D is a diagram illustrating selection by each optical switch of the signal protection switch 620-d of the communication node 710-d in a state in which the failure has occurred in the optical fiber transmission line 323-o.

The optical fiber transmission line 323-o, in an ordinary state, transmits the optical signal 423-o to be sent from the communication node 710-d to the communication node 710-c. Here, since the failure has occurred in the optical fiber transmission line 323-i, the communication node 710-c and 710-d have the optical signal 423-o be transmitted through the optical fiber transmission line in which the failure has not occurred in order to bypass the optical fiber transmission line 323-i. Therefore, as shown in FIG. 15C, the optical switch 211 selects the optical multiplexing and demultiplexing device 222 and, as shown in FIG. 15D, the optical switch 214 selects the optical multiplexing and demultiplexing device 223.

Next, flows of operations of the optical network system of the fourth embodiment are described. In an ordinary state where no failure has occurred in any of the optical fiber transmission lines 321-i, 321-o, 322-i, 322-o, 323-i, 323-o, 324-i, and 324-o, as shown in FIG. 14, each optical signal is transmitted normally between communication nodes being adjacent to each other.

Figure 16:
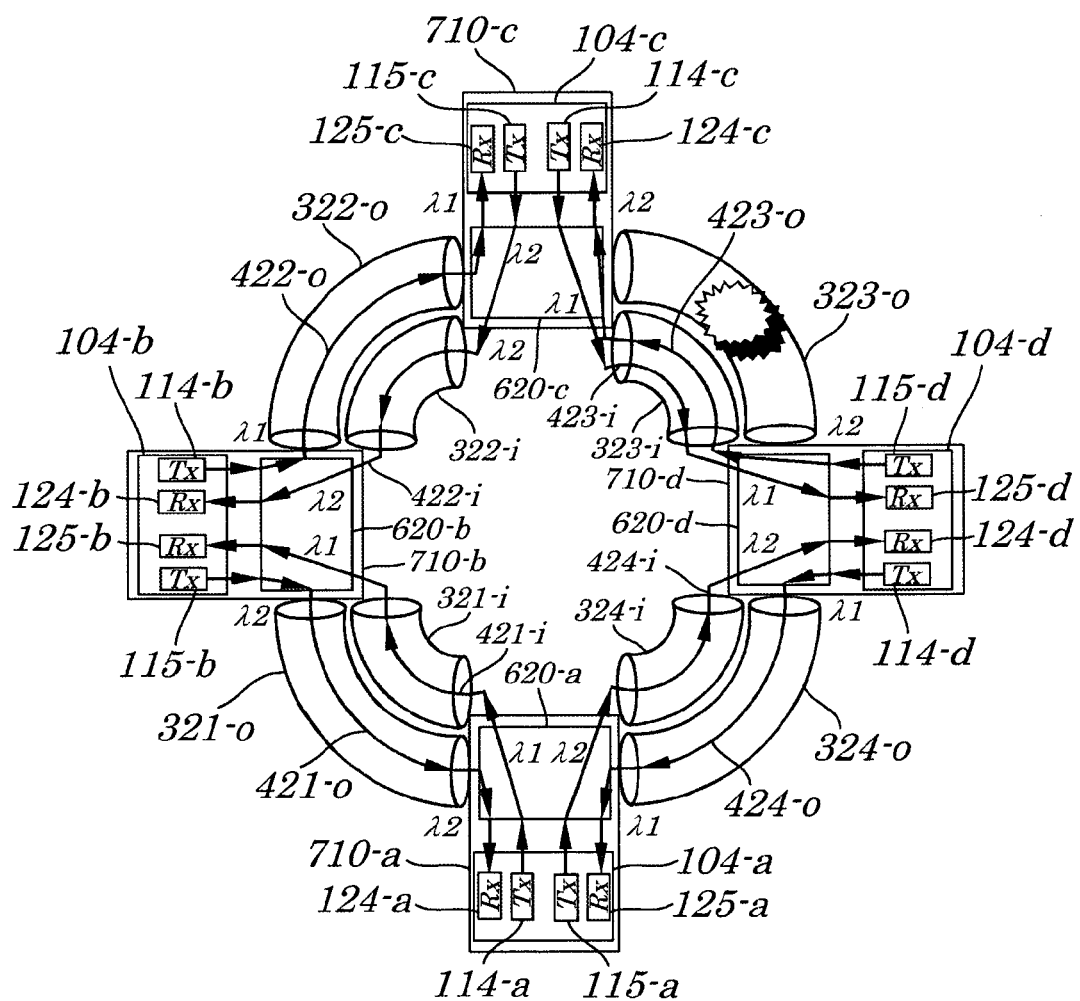
FIG. 16 is a diagram explaining operations of the optical network system of the fourth embodiment of the present invention.

FIG. 16 is a diagram explaining operations of the optical network system of the fourth embodiment of the present invention. In the example shown in FIG. 16, let it be assumed that the failure caused by breakage of a fiber, degradation in characteristics or a like has occurred in the optical fiber transmission line 323-o.

If the failure has occurred in the optical fiber transmission line 323-o, as shown in FIG. 16, switching is done so that an optical signal 423-o that had been transmitted through the optical fiber transmission line 323-o in an ordinary state begins to be transmitted through the optical fiber transmission line 323-i. That is, the communication node 710-d transmits the optical signal 423-o to the optical fiber transmission line 323-i and the communication node 710-c receives the optical signal 423-o from the optical fiber transmission line 323-i.

Other communication nodes 710-a and 710-b operate in a same manner as in the case of an ordinary state.

Since each of the signals 423-i and 432-o has a different wavelength, the two signals are completely isolated by the optical multiplexing and demultiplexing device and, therefore, both the signals 423-i and 432-o are normally transmitted between the optical signal transceivers 104-c and 104-d. As a matter of course, a transmission band for each of the two signals is still maintained in a same manner as in the case of the normal state.

Likewise, if a failure occurs in an other optical fiber transmission line, switching is done so that an optical signal that had been transmitted through the optical fiber transmission in which the failure has occurred begins to be transmitted by the other optical fiber transmission line.

As described above, in the dual-ring-type optical network system made up of communication nodes each having two pair of optical signal transceivers and optical signal receivers and dual-ring-type optical fiber transmission lines of the fourth embodiment, wavelengths of two optical signals being transmitted between communication nodes adjacent to each other are made different from one another and, in an ordinary state, these two optical signals are transmitted through a different optical fiber transmission line. If a failure has occurred in any one of the optical fiber transmission lines, signal protection switches do switching so that an optical signal that had been transmitted through one optical fiber transmission line in which the failure has occurred begins to be transmitted through another optical fiber transmission line. This can achieve a satisfactory signal protection function which leads to high reliability in the optical network system. This also enables the dual-ring-type optical network system to be constructed at low costs.

It is apparent that the present invention is not limited to the above embodiments but may be changed and modified without departing from the scope and spirit of the invention. For example, in the above embodiments, as the transmission speed for every wavelength, 10 G bps is employed, however, the present invention is not limited to this and, for example, 80 G bps or 160 G bps may be used.

Also, in the above embodiments, a maximum number of wavelengths that can be multiplexed in one optical fiber transmission line is four however, an optical signal with eight or sixteen wavelengths may be multiplexed.

Moreover, in the above embodiment, as the wavelength of the optical signal, 1500 nm band is employed, however, 1300 nm band or 850 nm band may be also used.

Furthermore, a throughput, a number of wavelengths, a speed per channel, and a number of wavelengths to be multiplexed may be freely selected so long as they satisfy characteristic functions provided in the present invention.

What is claimed is:

1. A communication node comprising:
    an optical signal transceiver having at least one optical signal transmitting device and at least one optical signal receiving device to transmit and receive an optical signal to and from an opposite communication node;
    at least one optical signal transmitting communication line to transmit an optical signal to said opposite communication node;
    at least one optical signal receiving communication line to receive an optical signal from said opposite communication node; and
    a switching device, comprising:
        a first multiplexing and demultiplexing device including a first bi-directional port connected to said optical signal transmitting communication line, and a second multiplexing and demultiplexing device including a second bi-directional port connected to said optical signal receiving communication line; and
        a first optical switch which selects one of said first and second multiplexing and demultiplexing devices to be connected to said optical signal transmitting device, and a second optical switch which selects one of said first and second multiplexing and demultiplexing devices to be connected to said optical signal receiving device,
    wherein said switching device is connected to said optical signal transmitting device and to said optical signal receiving device to transmit, when no failure has occurred in said optical signal transmitting communication line and in said optical signal receiving communication line, an optical signal fed from said optical signal transmitting device to said optical signal transmitting communication line and to transmit an optical signal fed from said optical signal receiving communication line to said optical signal receiving device, wherein when a failure has occurred in said optical signal transmitting communication line, said switching device switches such that said optical signal fed from said optical signal transmitting device is transmitted via said second bi-directional port to said optical signal receiving communication line, and wherein when a failure has occurred in said optical signal receiving communication line, said switching device switches such that said optical signal to be fed to said optical signal receiving device is received via said first bi-directional port from said optical signal transmitting communication line.

2. The communication node according to claim 1, wherein wavelengths of optical signals transmitted from all said optical signal transmitting devices being placed in said optical signal transceiver are different from one another and from wavelengths of optical signals transmitted from said opposite communication node.

3. The communication node according to claim 1, wherein said first and second optical switches enable an optical signal to be transmitted in bidirectional directions.

4. A switching device for a communication node including an optical signal transceiver comprising at least one optical signal transmitting device and at least one optical signal receiving device to transmit and receive an optical signal to and from an opposite communication node, said switching device comprising:

a first multiplexing and demultiplexing device including a first bi-directional port connected to said optical signal transmitting communication line, and a second multiplexing and demultiplexing device including a second bi-directional port connected to said optical signal receiving communication line; and a first optical switch which selects one of said first and second multiplexing and demultiplexing devices to be connected to said optical signal transmitting device, and a second optical switch which selects one of said first and second multiplexing and demultiplexing devices to be connected to said optical signal receiving device wherein said switching device configured to be connectable to at least one piece of an optical signal transmitting communication line to transmit an optical signal to said opposite communication node, at least one piece of an optical signal receiving communication line to receive an optical signal from said opposite communication node, said optical signal transmitting device and said optical signal receiving device, wherein, when no failure has occurred in said optical signal transmitting communication line and in said optical signal receiving communication line, an optical signal fed from said optical signal transmitting device is transmitted to said optical signal transmitting communication line and an optical signal fed from said optical signal receiving communication line is transmitted to said optical signal receiving device, and wherein, when a failure has occurred in said optical signal transmitting communication line, switching is done such that said optical signal fed from said optical signal transmitting device is transmitted via said second bi-directional port to said optical signal receiving communication line and, when a failure has occurred in said optical signal receiving communication line, switching is done such that said optical signal to be fed to said optical signal receiving device is received via said first bi-directional port from said optical signal transmitting communication line.

5. The switching device according to claim 4, wherein wavelengths of optical signals fed from all of said optical signal transmitting devices being placed in said optical signal transceiver are different from one another and from those of optical signals transmitted from said opposite communication node.

6. The switching device according to claim 4, wherein said first and second optical switches enable an optical signal to be transmitted in bidirectional directions.

7. A switching device that transmits a plurality of external optical signals through a plurality of optical signal communication lines, comprising:

a plurality of optical multiplexing and demultiplexing devices each corresponding to one of said plurality of optical signal communication lines and each device including a bi-directional communicating input port and a bi-directional communicating output port, wherein optical signals of different types are communicated between said bi-directional communicating input and output ports of different devices of said plurality of optical multiplexing and demultiplexing devices through one of said plurality of optical signal communication lines that corresponds to specific optical multiplexing and demultiplexing devices; and a plurality of optical switches that correspond to and communicates one of said plurality of external optical signals between said plurality of optical signal communication lines and a bi-directional communicating input and a bi-directional communicating output port of one of said specific optical multiplexing and demultiplexing devices, wherein when no failure has occurred in one of said plurality of optical signal communication lines, and when a failure has occurred in one of said plurality of optical signal communication lines, said one of said plurality of external optical signals is communicated to a bi-directional communicating input and a bi-directional communicating output port of an other of said specific optical multiplexing and demultiplexing devices, and wherein bidirectional communication are conducted through the input and output ports.

8. The switching device according to claim 7, wherein said input and output ports of said plurality of said optical multiplexing and demultiplexing devices transmit and receive optical signals of different wavelengths.

9. A communication node comprising:

an optical signal transceiver including an optical signal transmitting device and an optical signal receiving device to transmit and receive an optical signal to and from another communication node;

an optical signal transmitting communication line to transmit an optical signal to said another communication node;

an optical signal receiving communication line to receive an optical signal from said another communication node; and a switching device comprising:

a first multiplexing and demultiplexing device including a bi-directional port connected to said optical signal transmitting communication line, and a second multiplexing and demultiplexing device including a bi-directional port connected to said optical signal receiving communication line; and a first optical switch which selects one of said first and second multiplexing and demultiplexing devices to be connected to said optical signal transmitting device, and a second optical switch which selects one of said first and second multiplexing and demultiplexing devices to be connected to said optical signal receiving device.

10. A switching device for a communication node including an optical signal transceiver having an optical signal transmitting device and an optical signal receiving device to transmit and receive an optical signal to and from another communication node, an optical signal transmitting communication line to transmit an optical signal to said another communication node, and an optical signal receiving communication line to receive an optical signal from said another communication node, said switching device comprising:

a first multiplexing and demultiplexing device including a first bi-directional port connected to said optical signal transmitting communication line, and a second multiplexing and demultiplexing device including a second bi-directional port connected to said optical signal receiving communication line; and a first optical switch which selects one of said first and second multiplexing and demultiplexing devices to be connected to said optical signal transmitting device, and a second optical switch which selects one of said first and second multiplexing and demultiplexing devices to be connected to said optical signal receiving device.

* * * * *